United States Patent
Jayaraman et al.

(10) Patent No.: US 11,824,837 B2
(45) Date of Patent: Nov. 21, 2023

(54) END USER CREATION OF TRUSTED INTEGRATION PATHWAYS BETWEEN DIFFERENT ENTERPRISE SYSTEMS

(71) Applicant: SAP SE, Walldorf (DE)

(72) Inventors: Sridhar Jayaraman, Mannheim-Seckenheim (DE); Dirk Boessmann, Sinsheim (DE)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 16/929,834

(22) Filed: Jul. 15, 2020

(65) Prior Publication Data

US 2022/0021657 A1 Jan. 20, 2022

(51) Int. Cl.
*H04L 9/40* (2022.01)
*G06F 16/245* (2019.01)
*G06F 16/25* (2019.01)
*G06F 3/04842* (2022.01)

(52) U.S. Cl.
CPC ............ *H04L 63/04* (2013.01); *G06F 16/245* (2019.01); *G06F 16/258* (2019.01); *G06F 3/04842* (2013.01)

(58) Field of Classification Search
CPC ..... H04L 63/04; G06F 16/245; G06F 16/258; G06F 3/04842
See application file for complete search history.

(56) References Cited

U.S. PATENT DOCUMENTS

| | | | |
|---|---|---|---|
| 8,296,433 B2 * | 10/2012 | Stevens | H04L 67/10 709/225 |
| 9,052,879 B2 * | 6/2015 | Scott | G06F 8/20 |
| 9,430,114 B1 * | 8/2016 | Dingman | G06F 16/25 |
| 9,811,394 B1 * | 11/2017 | Kogias | H04L 67/34 |
| 9,961,011 B2 * | 5/2018 | Mordani | G06F 9/4451 |
| 9,996,344 B2 | 6/2018 | Fildebrandt et al. | |
| 10,304,222 B2 * | 5/2019 | Alli | H04L 67/02 |
| 10,313,421 B2 | 6/2019 | Band et al. | |
| 10,374,905 B2 * | 8/2019 | Herreria | H04L 41/22 |
| 10,432,707 B2 * | 10/2019 | Hosie | H04L 67/101 |
| 10,715,524 B1 * | 7/2020 | Paulus | H04L 63/107 |
| 10,769,166 B1 * | 9/2020 | Hankins | G06F 16/254 |
| 10,910,095 B1 * | 2/2021 | Shapiro | G06F 3/04847 |
| 10,944,641 B1 * | 3/2021 | Zacks | G06F 3/04847 |
| 10,965,547 B1 * | 3/2021 | Esposito | G06F 21/6236 |
| 11,032,282 B2 * | 6/2021 | Revanur | H04L 63/10 |
| 11,151,151 B2 * | 10/2021 | Reeve | G06F 16/9035 |

(Continued)

*Primary Examiner* — Jeremy L Stanley
(74) *Attorney, Agent, or Firm* — Fish & Richardson P.C.

(57) ABSTRACT

Methods and systems are used for end user creation of trusted integration pathways between different enterprise systems. As an example, a set of identity information associated with an end user is determined. A set of systems and a set of configurable trusted integration pathways that the end user is authorized to create a trusted integration pathway between two systems is determined. A selection of a source system and a destination system from the set of systems is received. A set of information from the source system that is allowed to be shared with the destination system based on pre-defined metadata is identified. A trusted integration pathway between the source system and the destination system is generated, based on a selection of at least a portion of the set of information and the pre-defined metadata.

18 Claims, 15 Drawing Sheets

(56) References Cited

U.S. PATENT DOCUMENTS

| | | | | |
|---|---|---|---|---|
| 2003/0115119 A1* | 6/2003 | Schleicher | G06Q 40/025 | 705/35 |
| 2005/0262194 A1* | 11/2005 | Mamou | G06F 16/254 | 709/203 |
| 2006/0069717 A1* | 3/2006 | Mamou | G16H 40/20 | 709/203 |
| 2006/0235838 A1* | 10/2006 | Shan | G06F 16/256 | |
| 2006/0265385 A1* | 11/2006 | Agrawal | G06F 16/256 | |
| 2008/0065668 A1* | 3/2008 | Spence | G06Q 10/06 | |
| 2008/0082569 A1* | 4/2008 | Mansour | G06Q 10/10 | 707/999.102 |
| 2008/0140692 A1* | 6/2008 | Gehring | G06F 16/254 | |
| 2009/0125796 A1* | 5/2009 | Day | G06F 9/451 | 715/764 |
| 2010/0077386 A1* | 3/2010 | Akkiraju | G06F 8/36 | 717/136 |
| 2011/0219035 A1* | 9/2011 | Korsunsky | G06F 21/00 | 707/E17.005 |
| 2011/0246961 A1* | 10/2011 | Tripathi | G06F 8/34 | 717/105 |
| 2012/0296862 A1* | 11/2012 | Duda | G06F 16/254 | 707/602 |
| 2013/0204884 A1* | 8/2013 | Stewart | G06F 16/13 | 707/E17.058 |
| 2013/0263289 A1* | 10/2013 | Vijayan | G06F 16/13 | 726/31 |
| 2014/0344210 A1* | 11/2014 | Leigh | G06F 16/254 | 707/602 |
| 2014/0380105 A1* | 12/2014 | Michel | G06F 11/0709 | 714/57 |
| 2015/0207758 A1* | 7/2015 | Mordani | H04L 47/78 | 709/226 |
| 2015/0372877 A1* | 12/2015 | Tompkins | H04L 41/5009 | 715/736 |
| 2016/0034318 A1* | 2/2016 | Byreddy | G06F 9/5072 | 718/105 |
| 2016/0205035 A1* | 7/2016 | Kurian | H04L 67/61 | 709/217 |
| 2016/0277530 A1* | 9/2016 | Jung | H04W 4/70 | |
| 2016/0357401 A1* | 12/2016 | Gravenites | G06F 9/453 | |
| 2016/0357535 A1* | 12/2016 | Gravenites | G06F 8/60 | |
| 2016/0357540 A1* | 12/2016 | Allgeier | G06F 9/541 | |
| 2016/0358354 A1* | 12/2016 | Alli | H04L 67/02 | |
| 2016/0359689 A1* | 12/2016 | Herreria | G06F 3/04847 | |
| 2016/0359690 A1* | 12/2016 | Gravenites | G06F 3/04842 | |
| 2016/0359964 A1* | 12/2016 | Modi | H04L 67/55 | |
| 2017/0011135 A1* | 1/2017 | Srivastava | G06F 16/258 | |
| 2017/0171049 A1* | 6/2017 | Kriegesmann | H04L 67/1097 | |
| 2017/0199989 A1* | 7/2017 | Lilko | G06F 21/6218 | |
| 2017/0264612 A1* | 9/2017 | Kaushal | H04L 63/168 | |
| 2017/0287035 A1* | 10/2017 | Barday | G06Q 50/265 | |
| 2018/0034890 A1* | 2/2018 | Singhvi | G06F 16/13 | |
| 2018/0081643 A1* | 3/2018 | Gravenites | G06F 8/71 | |
| 2018/0081739 A1* | 3/2018 | Gravenites | H04L 41/0856 | |
| 2018/0136989 A1* | 5/2018 | Drollinger | G06F 9/546 | |
| 2018/0145899 A1* | 5/2018 | Rao | H04L 41/40 | |
| 2018/0167490 A1* | 6/2018 | Morton | G06F 3/167 | |
| 2018/0210709 A1* | 7/2018 | Bharthulwar | G06F 8/24 | |
| 2018/0218053 A1* | 8/2018 | Koneru | G06F 3/0482 | |
| 2018/0225389 A1* | 8/2018 | Swindell | G06F 16/245 | |
| 2018/0254989 A1* | 9/2018 | Braddy | H04L 67/56 | |
| 2018/0309790 A1* | 10/2018 | Johnson | H04L 63/20 | |
| 2018/0341762 A1* | 11/2018 | Gravenites | H04L 9/088 | |
| 2019/0087075 A1* | 3/2019 | Dhayanithi | G06F 3/04842 | |
| 2019/0132351 A1* | 5/2019 | Linde | G06F 11/30 | |
| 2019/0138965 A1* | 5/2019 | Narayanaswamy | G06F 16/84 | |
| 2019/0147114 A1* | 5/2019 | MacLean | G06F 16/21 | 707/769 |
| 2019/0171828 A1* | 6/2019 | Yarlagadda | H04L 67/1097 | |
| 2019/0332374 A1* | 10/2019 | Harner | G06F 8/70 | |
| 2019/0370263 A1* | 12/2019 | Nucci | G06F 16/254 | |
| 2019/0370369 A1* | 12/2019 | Kulkarni | G06F 16/9535 | |
| 2020/0097475 A1* | 3/2020 | Tran | G06F 16/23 | |
| 2020/0125540 A1* | 4/2020 | Thatte | G06F 16/258 | |
| 2020/0125948 A1* | 4/2020 | Modi | G06Q 10/10 | |
| 2020/0125977 A1* | 4/2020 | Andrabi | G06N 5/003 | |
| 2020/0133640 A1* | 4/2020 | Thiru | G06F 9/44505 | |
| 2020/0183947 A1* | 6/2020 | Reeve | G06F 16/254 | |
| 2020/0334135 A1* | 10/2020 | Bragdon | G06F 11/3419 | |
| 2020/0403859 A1* | 12/2020 | Balanescu | H04L 41/0816 | |
| 2021/0083843 A1* | 3/2021 | Salomon | G06F 21/602 | |
| 2021/0096919 A1* | 4/2021 | Rajendran | G06F 9/5011 | |
| 2021/0132921 A1* | 5/2021 | Ramaiah | G06F 8/34 | |
| 2021/0216545 A1* | 7/2021 | Fusco | G06F 16/24575 | |
| 2021/0241357 A1* | 8/2021 | Fursman | G06F 16/258 | |
| 2021/0264333 A1* | 8/2021 | Xing | G06Q 10/0633 | |
| 2021/0326350 A1* | 10/2021 | Gupta | G06F 16/906 | |
| 2021/0334148 A1* | 10/2021 | Prakash | G06N 5/04 | |
| 2021/0349887 A1* | 11/2021 | Alonzo | G06F 16/284 | |
| 2022/0012170 A1* | 1/2022 | Mukherjee | G06F 16/283 | |

* cited by examiner

END USER CREATION OF TRUSTED INTEGRATION PATHWAYS BETWEEN DIFFERENT ENTERPRISE SYSTEMS

BACKGROUND

An enterprise may utilize an integration technology to define and develop system to system integrations to retrieve, transform, and move enterprise data and information from source systems to destination systems. Enterprise data and information may include enterprise reference data and operational data that may be stored at one or more databases managed by the source and destination systems. Enterprise reference data may describe the structure and characteristics of the enterprise and is not transactional in nature. Operational data is transactional data required by planning, manufacturing, purchasing, sales, accounting, monitoring, or other enterprise applications associated with the enterprise.

SUMMARY

The present disclosure describes end user creation of trusted integration pathways between different enterprise systems.

In an implementation, a computer-implemented method is used for end user creation of trusted integration pathways between different enterprise systems. An end user interacting with a platform integration system (PIS) is identified, by the PIS. A set of identity information associated with the end user is determined, by the PIS. Based on the set of identify information, a set of systems and a set of configurable trusted integration pathways that the end user is authorized to create a trusted integration pathway between two systems is determined, by the PIS. A selection of a source system and a destination system from the set of systems is received, by the PIS. A set of information from the source system that is allowed to be shared with the destination system based on pre-defined metadata is identified, by the PIS. A user interface (UI) with at least a portion of the set of information based on the pre-defined metadata is populated, by the PIS. A selection of a set of the at least the portion of the set of information is received, by the PIS. A trusted integration pathway between the source system and the destination system is generated, by the PIS, based on the selection of the set of the at least the portion of the set of information and the pre-defined metadata. A selection of a configurable trusted integration pathway of the set of configurable trusted integration pathways is received. Generation of the trusted integration pathway between the source system and the destination system is further based on the selection of the configurable trusted integration pathway. The selection of the set of the at least the portion of the set of information comprises a source data object and associated object query configuration information. During execution of the trusted integration pathway, the set of information is queried from the source system and shared with the destination system based on the source data object and the associated object query configuration information. The selection of the set of the at least the portion of the set of information comprises output format configuration information. During execution of the trusted integration pathway, the set of information from the source system is mapped and transformed to a format supported by the destination system based on the output format configuration information. The selection of the set of the at least the portion of the set of information comprises source system configuration information and destination system configuration information. During execution of the trusted integration pathway, access to the source system and the destination system is delegated based on the corresponding source system configuration information and the destination system configuration information. A selection of a set of recurrence configuration information that specifies when execution of a packaged trusted integration pathway between the source system and the destination system is to occur is received. The packaged trusted integration pathway between the source system and the destination system is generated based on the trusted integration pathway between the source system and the destination system and the selection of the set of recurrence configuration information. The pre-defined metadata maps between a set of human-understandable terms and corresponding set of PIS parameters. The corresponding set of PIS parameters comprises one or more tenants, one or more entities, one or more systems including one or more source systems and one or more destination systems, one or more system types, one or more data objects including one or more source data objects and one or more destination data objects, one or more sender and receiver protocols, one or more query parameters for each of the one or more source data objects to be transferred, and one or more mappings and transformations for each of the one or more source data objects to be transferred.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, an end user integration using end user creation of trusted integration pathways between different enterprise systems allows end users to ensure and adhere to an enterprise's organizational policies. Second, allowing an administrator user to define trusted integration pathway templates along with detailed policies ensures that end users can move any data in a fashion not approved by the organization. Third, the end user created trusted integration pathways between different enterprises systems run in the authorization context of a non-technical end user, for example, a business user. Fourth, running the end user created trusted integration pathways in the authorization context of the end user allows the end user to work with data, for example, business data without the need for any specialized authorizations to be given to the end user. Fifth, running the end user created trusted integration pathways in the authorization context of end user ensures that the end user cannot move data that the end user is not authorized to move. Sixth, the end user integration using end user creation of trusted integration pathways between different enterprise systems enables automation of repetitive tasks for a non-technical end user, for example, a business user. Seventh, the end user integration allows end users to move data from a source system to a destination system using one or more optional simple customizations, while ensuring and adhering to an enterprise's organizational policies. Eighth, the end user integration is context sensitive, for example, business context sensitive. Ninth, the end user integration adheres to an enterprise's organizational policies and governance. Tenth, the end user integration provides simplicity for non-technical users.

The details of one or more implementations of the subject matter of this specification are set forth in the detailed description, the claims, and the accompanying drawings. Other features, aspects, and advantages of the subject matter will become apparent to those of ordinary skill in the art from the detailed description, the claims, and the accompanying drawings.

DETAILED DESCRIPTION

Figure 1:
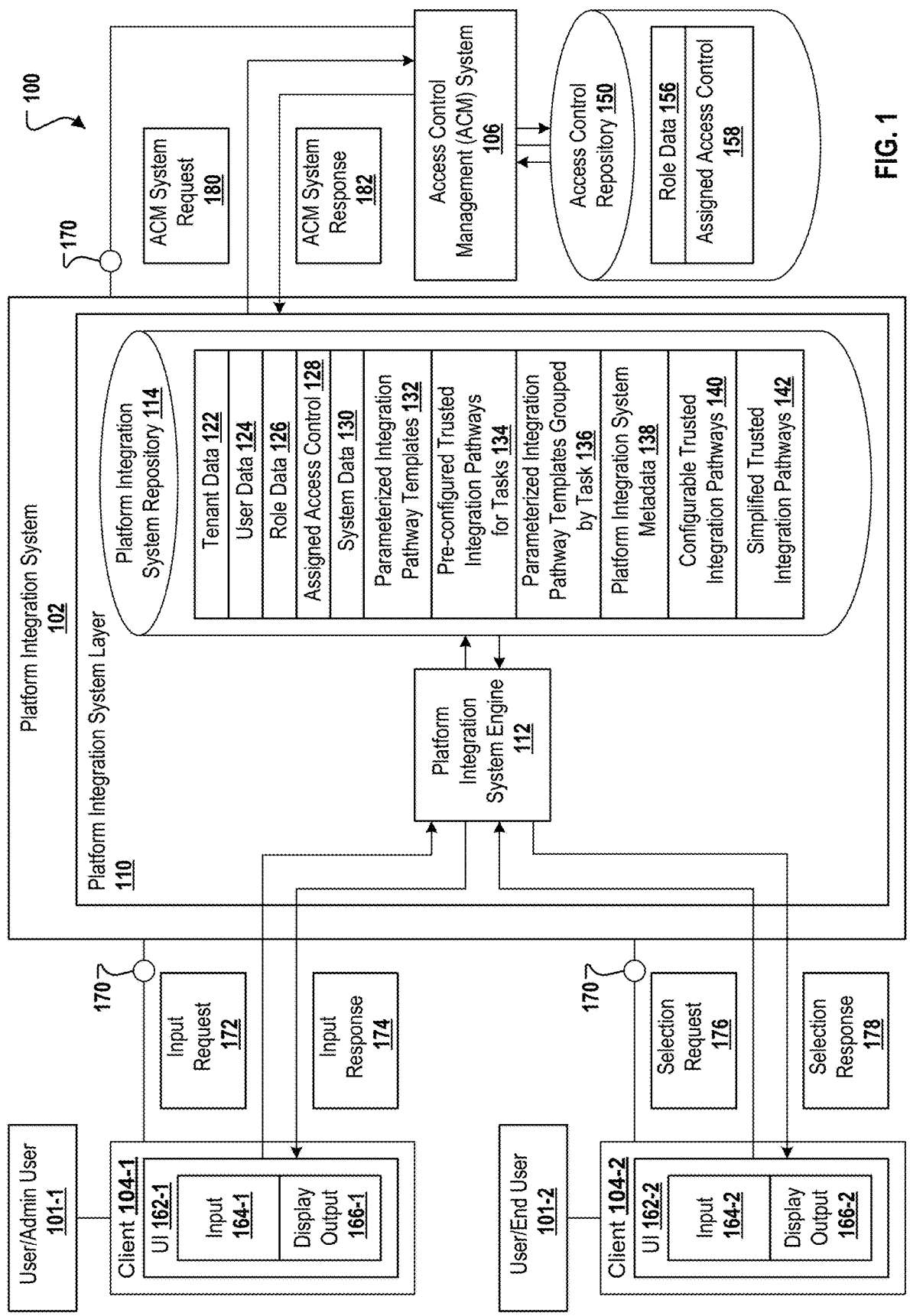
FIG. 1 is a block diagram illustrating an example distributed computing system (DCS) for providing end user creation of trusted integration pathways between different enterprise systems, according to an implementation of the present disclosure.

The following detailed description describes end user creation of trusted integration pathways between different enterprise systems, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

An enterprise may utilize integration technology to define and develop system to system integrations to retrieve, transform, and move enterprise data and information from source systems to destination systems. Enterprise data and information may include enterprise reference data and operational data that may be stored at one or more databases managed by the source and destination systems. Enterprise reference data may describe the structure and characteristics of the enterprise, and is not transactional in nature. Operational data is transactional data required by planning, manufacturing, purchasing, sales, accounting, monitoring, or other enterprise applications associated with the enterprise. Defining and developing system to system integrations can be a complex task that requires technical experts with specialized skill sets in various technologies. An enterprise may have a small team of technical experts that work on the core and central system to system integration needs of the enterprise.

Meanwhile, end users may have individual requirements to move enterprise data and information between systems not covered by existing implementations of system to system integrations. However, those end users may not possess the specialized skills to define and develop system to system integrations that meet their needs. An end user may be a non-technical business user, such as, for example, a sales representative, an accountant, or a human resources (HR) administrator, each having their own individual requirements to move data between systems. For example, a sales representative, when new promotions are made available, may want to automate retrieval of sales promotions that are relevant to their region or clients as an email. Another sales representative may want to automatically download information related to the clients and accounts for which they are responsible into their corporate branded drive every Sunday, allowing them to plan for the coming week and have the information available immediately on Monday. As another example, an HR administrator may want to automatically move data of newly hired employees into an enterprise's employee system every Monday morning. Lacking an existing system to system integration that meets their individual needs and the technical skills required to develop one on their own, these end users perform these tasks manually by logging into the relevant systems and software applications, utilizing each systems' respective user interface (UI) to query for specific data, and downloading the specific data as spreadsheets or other types of documents. This manual interaction for searching for and then collating data can be a tedious and time-consuming process.

In contrast to typical integration technology, end user creation of trusted integration pathways between different enterprise systems is disclosed herein. The end user creation of trusted integration pathways between different enterprise systems may be utilized to create and deploy simplified and human-understandable system to system integrations (also referred herein as simplified trusted integration pathways) by a non-technical end user, such as, for example, a business user.

A platform integration system (PIS) provides a user interface (UI) that is relatively simple and provides an easy way to create and deploy simplified trusted integration pathways. An example PIS may include a PIS layer, a PIS engine, and a PIS repository. The PIS engine may include platform integration system-side (PIS-side) UI functionality. A UI is a client-side UI that may be installed on an example client system (also referred herein as a client), or otherwise made available to the client system, such as through a remote connection to a webpage, web site, or remote application.

The PIS allows a technical user, such as an integration administrator or an integration specialist, for example, to define and publish configurable trusted integration pathway templates for usage by an end user, such as, for example, a business user. The integration administrator and the integration specialist are highly technical users with a deep understanding of data models, data types, and the mapping and transformation approaches utilized to integrate data. The technical user may utilize the PIS to, among other actions: 1) define a plurality of parameterized integration pathway templates, 2) define a pre-configured trusted integration pathway for a particular task of one or more tasks, such as, for example, download sales promotions by region, 3) group one or more parameterized integration pathway templates of the plurality of the parameterized integration pathway templates that together achieve the particular task of the one or more tasks, 4) define PIS metadata, where the PIS metadata maps a set of human-understandable terms to a corresponding set of parameterized PIS data, and the set of parameterized PIS data may include source system data, data object data, destination system data, query data, mapping data, transformation data, and recurrence data, 5) assign access control to at least a subset of the set of the parameterized PIS data including assigning access rights to each role authorized to access a first subset of the set of the parameterized PIS data and assigning usage rights to each role authorized to use a second subset of the set of the parameterized PIS data, and 6) publish a configurable trusted integration pathway template for consumption by end users. The integration administrator and/or the integration specialist may also monitor and supervise active end user integrations to address any issues that may occur during the configuration process.

The PIS further allows an end user (also referred herein as a non-expert end user, a non-expert business user, and/or a business user) to, among other actions: 1) filter configurable trusted integration pathways based on the defined PIS metadata including a source system, a destination system, and a source data object, 2) configure a particular filtered configurable trusted integration pathway of the filtered trusted integration pathways to create a simplified trusted integration pathway that meets the particular requirements and needs of the end user, 3) package the simplified trusted integration pathway, 4) verify the simplified trusted integration pathway, 5) deploy the simplified trusted integration pathway based on the verification, and 6) run the simplified trusted integration pathway from either a standalone application or from within an existing application that they are already using. In this manner, an end user can create, verify, deploy, and run simplified trusted integration pathways between different enterprise systems to optimize processes and tasks of their daily operation and business.

The PIS approach has at least one or more of the following advantages. First, the use of trusted pathways abstracts and hides the technical complexity of integration pathways from non-expert end users. Second, the use of human-understandable terms and PIS metadata enables non-technical users to understand and easily consume integrations. Third, the parameterized integration pathway templates and the use of access controls to each portion of the parameterized PIS data allows the organization to govern and enforce organizational policies. Fourth, by providing configurable trusted integration pathways, the PIS enables distributed automation by individual end users and expansion of the user base beyond a smaller group of technical experts inside the organization. Fifth, by reaching an expanded user base within the organization, the PIS may help improve efficiency across the organization, making insights and connections available to all users, not just those with advanced technical skills. Sixth, by utilizing machine learning techniques, the PIS may provide better suggestions and semi-automated configurable trusted integration pathways can be achieved, which may further reduce and simply the work required by the end user to configure, package, and deploy simplified trusted integration pathways.

FIG. 1 is a block diagram illustrating an example distributed computing system (DCS) for providing end user creation of trusted integration pathways between different enterprise systems, according to an implementation of the present disclosure. At a high level, the illustrated DCS 100 includes or is made up of one or more communicably coupled computers or other components (see FIG. 15) that communicate across a network 160 (e.g., operating within a cloud-computing-based environment). The illustrated DCS 100 includes a platform integration system (PIS) 102, client systems 104, including client systems 104-1 and 104-2, an access control management (ACM) system 106, a PIS layer 110, a PIS engine 112, a PIS repository 114, an access control repository 150, and UIs 162, including UIs 162-1 and 162-2, deployed on client systems 104-1 and 104-2, respectively. The PIS engine 112 may include PIS-side UI functionality. Each UI 162 is a client-side UI that may be installed on an example client system. Although the detailed description is focused on simplified and human-understandable system to system integration functionality, other functionality is envisioned to be covered by the described subject matter. Discussion of simplified and human-understandable system to system integration functionality is not intended to limit the detailed description in any way.

The PIS allows a technical user to define and publish configurable trusted integration pathways and enables an end user to create and deploy simplified trusted integration pathways between different enterprise systems based on the published trusted integration pathways. The PIS 102 may be any computing device operable to connect to and/or communicate with at least the client systems 104, the ACM system 106, and the UIs 162 of the corresponding client systems 104 (or components interfacing with any of these—whether or not illustrated). The PIS 102 may comprise a single endpoint. The PIS 102 may further comprise example endpoints including an input endpoint at the PIS engine 112, a selection endpoint at the PIS engine 112, other endpoints at the PIS engine 112, other endpoints at the PIS layer 110, or other endpoints at the PIS 102.

As illustrated, the PIS 102 connects or interfaces to client systems 104-1 and 104-2. In other instances, the PIS 102 may connect to a plurality of client systems 104, where appropriate. In general, the PIS 102 comprises an electronic computing device operable to receive, transmit, process, and store any appropriate data associated with the DCS 100. In a number of embodiments, the PIS 102 may be a component of a cloud platform integration system, a cloud platform integration operation cockpit, an application, or a platform integration application, or comprise a cloud platform integration system, a cloud platform integration operation cockpit, an application, or a platform integration application.

The client systems 104 can be used to interact with the PIS 102 and create or interact with configurable trusted integration pathways and simplified trusted integration pathways between different enterprise systems. Each client system 104 may be any computing device operable to connect to and/or communicate with at least the PIS 102, and/or the PIS layer 110 of the PIS 102, and/or the PIS engine 112 of the PIS layer 110 (or components interfacing with any of these—whether or not illustrated). As illustrated, client system 104-1 connects or interfaces to the PIS 102 at the input endpoint at the PIS engine 112, and client system 104-2 connects or interfaces to the PIS 102 at the selection endpoint at the PIS engine 112. Each client system 104 may also connect or interface to one or more of the example endpoints described above.

In general, the client system 104 comprises an electronic computing device operable to receive, transmit, process, and store any appropriate data associated with the DCS 100. There may be any number of client systems 104 associated with, or external to, the DCS 100.

Each UI 162 operates with the PIS engine 112, with the combination being used to create, test, and deploy simplified and human-understandable system to system integrations based on associated PIS repository 114 data. Each UI 162 may comprise a graphical user interface (GUI), including, for example, input boxes, such as, for example, a corresponding one of inputs 164, either input 164-1 of UI 162-1 or input 164-2 of UI 126-2, respectively, and at least one display area, such as, for example, a corresponding one of display outputs 166, either display output 166-1 of UI 162-1 or display output 166-2 of UI 162-2, respectively. A user, for example, one of users 101, either user 101-1 or user 101-2, may enter input in human-readable form, for example, as a string of text, in the corresponding one of inputs 164, either input 164-1 or input 164-2, respectively. The user 101 may see the results of the input at the corresponding display output 166. A user, such as, for example, one of users 101, either user 101-1 or user 101-2, may also see output in human-readable form, such as, for example, a list of selectable variants associated with the PIS repository 114, provided by the PIS engine 112 at the corresponding one of display outputs 166. The user 101 may provide response data, such as, for example, one or more selections from the list of selectable variants associated with the PIS repository 114, to the PIS engine 112.

In one or more embodiments, each UI 162 may further comprise a trusted secure interface between each UI 162 and the PIS-side UI functionality of the PIS engine 112. In one or more embodiments, each UI 162 may comprise one or more authenticated representational state transfer (REST) calls from the UI 162 to the PIS-side UI functionality of the PIS engine 112. Each authenticated REST call may include one or more of the example endpoints described above.

Each UI 162 may be application agnostic and may provide a minimal set of functionality needed to support authentication and communication with the PIS-side UI functionality of the PIS engine 112. In particular, the minimal set of functionality provided by each UI 162 may include, for example, user authentication at the PIS-side UI functionality of the PIS engine 112, management of security data, such as, open authorization (OAuth) refresh and access tokens provided by an OAuth server (not illustrated in FIG. 1), exchange of input request data and input response data, and exchange of selection request data and selection response data. Each UI 162 may provide security data in an input request 172 or a selection request 176. The security data may include an OAuth access token which the PIS engine 112 may utilize for authenticating each UI 162.

The ACM system 106 may be any computing device operable to connect to and/or communicate with at least the access control repository 150, and/or PIS 102, and/or PIS layer 110, and/or PIS engine 112, (or components interfacing with any of these—whether or not illustrated). The ACM system 106 provides access control functionality including assignment of access control functionality and authentication and authorization functionality. The access control functionality of the ACM system 106 allows an authenticated and authorized user to assign access control to at least a subset of a set of parameterized PIS data including assigning access rights to each role authorized to access at least a first subset of the set of parameterized PIS data and assigning usage rights to each role authorized to use at least a second subset of the set of parameterized PIS data. The set of parameterized PIS data may include source entity data, source system data, destination entity data, destination system data, query data, format data, recurrence data, and a trusted integration pathway. The authentication and authorization functionality of the ACM system 106 allows the PIS engine 112 to determine whether a particular role has access rights that authorize the particular role to access at least a third subset of the set of parameterized PIS data and has usage rights that authorize the particular role to use at least a fourth subset of the set of parameterized PIS data. As illustrated, the ACM system 106 connects or interfaces to the access control repository 150, the PIS 102, the PIS layer 110, and the PIS engine 112. In general, the ACM system 106 comprises an electronic computing device operable to receive, transmit, process, and store any appropriate data associated with the DCS 100.

The PIS repository 114 may include tenant data 122, which may include a list of tenants (also referred herein as entities), where each tenant in the list of tenants may include, for example, a tenant name, a tenant ID, at least one system associated with the tenant having at least one of a system name, a system ID, and a system type of corresponding system data 130 associated with the at least one system, among others.

The PIS repository 114 may also include user data 124, which may include a list of users, where each user in the list of users may include, for example, a user name, a user ID, and a role ID of corresponding role data 126 associated with at least one role, among others.

The PIS repository 114 may further include role data 126, which may include a list of roles, where each role in the list of roles may include, for example, a role name, a role ID, and an assigned access control ID of corresponding assigned access control 128 associated with access control assigned to at least a subset of a set of parameterized PIS data.

The PIS repository 114 may also include assigned access control 128, which may include a list of assigned access control, where each assigned access control in the list of assigned access control may include, for example, an assigned access control name, an assigned access control ID, and assigned access control to at least a subset of the set of the parameterized PIS data including access rights assigned to each role authorized to access a first subset of the set of the parameterized PIS data and usage rights assigned to each role authorized to use a second subset of the set of the parameterized PIS data. The set of parameterized PIS data may include, in some instances, source entity data, source system data, destination entity data, destination system data, query data, format data, recurrence data, and a trusted integration pathway.

The PIS repository 114 may further include system data 130, which may include a list of systems, where each system in the list of systems may include a system name, a system ID, a system type, data objects each having a data object name associated with the particular system, and a particular tenant associated with the particular system having a tenant name and a tenant ID.

The PIS repository 114 may also include parameterized integration pathway templates 132 including, which may include a list of parameterized integration pathway templates, where each parameterized integration pathway template in the list of parameterized integration pathway templates may include at least one of a parameterized integration pathway template name, a parameterized integration pathway template ID, or a particular sender and receiver protocol. Each parameterized integration pathway template may also include at least one of a particular mapping for a source structure and a destination structure, or a unique and repeatable context ID for each application and UI and data object combination.

The PIS repository 114 may further include pre-configured trusted integration pathways for tasks 134, which may include a list of pre-configured trusted integration pathways tasks. Each pre-configured trusted integration pathway task in the list of pre-configured trusted integration pathways tasks may include, for instances, a pre-configured trusted integration pathway task name, a pre-configured trusted integration pathway task ID, or a particular task having a task name and a task ID. Each pre-configured trusted integration pathway task may also include one or more source entities associated with the pre-configured trusted integration pathway task, each source entity having an entity name, an entity ID, and one or more source systems having a system name, a system ID, and a system type, and one or more destination entities associated with the pre-configured trusted integration pathway task, each destination entity having an entity name, an entity ID, and one or more destination systems having a system name, a system ID, and a system type.

The PIS repository 114 may also include parameterized integration pathway templates grouped by task 136, which may include a list of parameterized integration pathway templates grouped by a particular task that together achieve the particular task, where each parameterized integration pathway template grouped by a particular task in the list of parameterized integration pathway templates grouped by a particular task may include at least one of a pathway group name, a pathway group ID, the particular task having a task name and a task ID, and the one or more parameterized integration pathway templates having a parameterized integration pathway template name and a parameterized integration pathway template ID.

The PIS repository 114 may also include PIS metadata 138, which may include a set of human-understandable terms, PIS metadata, and a particular enterprise specific to the PIS metadata. The PIS metadata may map the set of human-understandable terms to a corresponding set of at least one of one or more parameters, one or more parameterized integration pathway templates, one or more pre-configured trusted integration pathways for tasks, one or more parameterized integration pathway templates grouped by task, one or more configurable trusted integration pathways, and/or one or more simplified trusted integration pathways. The one or more parameters may include one or more tenants, one or more source entities, one or more destination entities, one or more source systems, one or more source data objects, one or more destination systems, one or more sender and receiver protocols, one or more tasks, one or more formats, one or more query parameters for each of the one or more source data objects that may be transferred, and/or one or more mappings and transformations for each of the one or more source data objects that may be transferred, among others.

The PIS repository 114 may further include configurable trusted integration pathways 140, the pathways 140 including a list of configurable trusted integration pathways, where each configurable trusted integration pathway in the list of configurable trusted integration pathways may include a configurable trusted integration pathway name, a configurable trusted integration pathway ID, a source system configuration having at least one of a source system configuration name and a source system configuration ID, an object query configuration having at least one of an object query configuration name and an object query configuration ID, an output format configuration having at least one of an output format configuration name and an output format configuration ID, and a destination system configuration having at least one of a destination system configuration name and a destination system configuration ID.

The PIS repository 114 may also include simplified trusted integration pathways 142, which may include a list of simplified trusted integration pathways, where each simplified trusted integration pathway in the list of simplified trusted integration pathways may include a simplified trusted integration pathway name, a simplified trusted integration pathway ID, a configured source system having at least one of a source system name and a source system ID, a configured object query having at least one of an object query name and an object query ID, a configured output format having at least one of an output format name and an output format ID, and a configured destination system having at least one of a destination system name and a destination system ID.

The PIS repository 114 may further comprise a database and a set of database access functions. The PIS repository 114 may organize and store the tenant data 122, the user data 124, the role data 126, the assigned access control 128, the system data 130, the parameterized integration pathway templates 132, the pre-configured trusted integration pathways for tasks 134, the parameterized integration pathway templates grouped by task 136, the human-understandable terms and metadata 138, the configurable trusted integration pathways 140, and the simplified trusted integration pathways 142 in the database as an indexed data structure. The indexed data structure may comprise a hypercube structure, or another appropriate data structure. The PIS repository 114 may also allow the data in the PIS repository 114 to be searched, updated, retrieved, and/or accessed using other database access functionality.

The PIS repository 114 may comprise a relational database, such as, for example, a SAP HANA in-memory, column-oriented, relational database management system, a Microsoft SQL server relational database management system, an open data protocol (OData) based database, a representational state transfer (REST) based database, or another type of database system. The PIS repository 114 including the tenant data 122, the user data 124, the role data 126, the assigned access control 128, the system data 130, the parameterized integration pathway templates 132, the pre-configured trusted integration pathways for tasks 134, the parameterized integration pathway templates grouped by task 136, the human-understandable terms and metadata 138, the configurable trusted integration pathways 140, and the simplified trusted integration pathways 142 may be defined, grouped, configured, assigned, published, and maintained during a configuration process, an initialization process, and/or a maintenance process.

The access control repository 150 may include role data 156 including a list of roles, where each role of the list of roles may include, for example, a role name, a role ID, and an assigned access control ID of corresponding assigned access control 158 associated with access control assigned to at least a subset of a set of parameterized PIS data.

The access control repository 150 may also include assigned access control 158 including a list of assigned access control, where each assigned access control of the list of assigned access control may include an assigned access control name, an assigned access control ID, and assigned access control to at least a subset of the set of the parameterized PIS data including access rights assigned to each role authorized to access a first subset of the set of the parameterized PIS data and usage rights assigned to each role authorized to use a second subset of the set of the parameterized PIS data, or other suitable information. The set of parameterized PIS data may include at least source entity data, source system data, destination entity data, destination system data, query data, format data, recurrence data, and a trusted integration pathway.

The access control repository 150 may further comprise a database and a set of database access functions. The access control repository 150 may organize and store the role data 156, and the assigned access control 158 in the database as an indexed data structure. The indexed data structure may comprise a hypercube structure, or another appropriate data structure. The access control repository 150 may also allow the data in the access control repository 150 to be searched, updated, retrieved, and/or accessed using other database access functionality.

The access control repository 150 may comprise a relational database, such as, for example, a Microsoft SQL server relational database management system, an open data protocol (OData) based database, a representational state transfer (REST) based database, or another type of database system. The access control repository 150, including the role data 156 and the assigned access control 158, may be defined, grouped, configured, assigned, published, and maintained during a configuration process, an initialization process, and/or a maintenance process.

The PIS engine 112 may be installed on the PIS 102 and may include the PIS-side of the UI 162. The PIS engine 112 may support one or more of the example endpoints described above. These endpoints may be REST endpoints and may be utilized by the UI 162, as previously described.

In an example embodiment, during operation at initialization time, configuration time, or maintenance time, PIS engine 112 may receive a tenant input request including tenant data associated with a particular tenant, which may include a tenant name, a tenant ID, and/or at least one system associated with the particular tenant having at least one of a system name, a system ID, and a system type, among other such relevant information. The PIS engine 112 may perform an add tenant process to determine whether the tenant name and the tenant ID associated with the particular tenant matches at least one of a tenant name and a tenant ID stored at the tenant data 122 in the PIS repository 114. If the tenant name and the tenant ID associated with the particular tenant does not match the tenant name and the tenant ID stored at the tenant data 122, the PIS engine 112 may add the tenant data associated with the particular tenant to the tenant data 122 of the PIS repository 114. In a similar manner, one or more other tenants may be added to the tenant data 122 in the PIS repository 114, where the particular tenant and the one or more other tenants may represent all of the active tenants within the PIS layer 110 of the PIS 102.

The PIS engine 112 may receive a system input request including system data associated with a particular system including, for example, a system name, a system ID, a system type, one or more data objects each having a data object name associated with the particular system, and a particular tenant associated with the particular system having a tenant name and a tenant ID, among others. The PIS engine 112 may perform an add system process to determine whether the system name and the system ID associated with the particular system matches at least one of a system name and a system ID stored at the system data 130 in the PIS repository 114. If the system name and the system ID associated with the particular system does not match the system name and the system ID stored at the system data 130, the PIS engine 112 may add the system data associated with the particular system to the system data 130 of the PIS repository 114. In a similar manner, one or more other systems may be added to the system data 130 in the PIS repository 114, where the particular system and the one or more other systems may represent all of the active systems within the PIS layer 110 of the PIS 102.

In an example embodiment, during operation at definition time, set up time, update time, runtime, or other appropriate time, a user 101, such as, for example, an integration user 101-1, may define and publish a configurable trusted integration pathway for usage by at least one user 101, such as, for example, end user 101-2. The integration user 101-1 may enter input including, for example a parameterized integration pathway template definition input into input 164, such as, for example, input 164-1. The parameterized integration pathway template definition input may include, in some instances, a parameterized integration pathway template name, a parameterized integration pathway template ID, and a particular sender and receiver protocol having a sender and receiver protocol name and a sender and receiver protocol ID. The particular sender and receiver protocol can be, for example, an open data protocol (OData) to secure file transfer protocol (SFTP). The parameterized integration pathway template definition input may also include at least one of a particular mapping for a source structure and a destination structure, or a unique and repeatable context ID for each application and UI and data object combination. The client system 104, such as, for example, client system 104-1, may generate an input request 172 including the input including at least the parameterized integration pathway template definition input. The client 104-1 may transmit the input request 172 to the PIS engine 112 utilizing the UI 162-1 and the input endpoint at the PIS engine 112.

The PIS engine 112 may receive the input request 172 from the client 101-1 at the input endpoint. The PIS engine 112 may create a parameterized integration pathway template based on at least the parameterized integration pathway template definition input in the input request 172. The created parameterized integration pathway template may include at least the particular sender and receiver protocol in the parameterized integration pathway template definition input of the input request 172. The created parameterized integration pathway template may also include the particular mapping for a source structure and a destination structure, the unique and repeatable context ID for each application and UI and data object combination in the parameterized integration pathway template definition input of the input request 172, or other suitable information. When the parameterized integration pathway template has been successfully created, the PIS engine 112 may store, for example, a parameterized integration pathway template name, a parameterized integration pathway template ID, and the parameterized integration pathway template at the parameterized integration pathway templates 132 of the platform integration repository 114. The PIS engine 112 may also generate an input response 174 including at least an indicator indicating that the parameterized integration pathway template has been successfully created. When the parameterized integration pathway template was not successfully created, the PIS engine 112 may generate an input response 174 including at least an indicator indicating that the parameterized integration pathway template was not successfully created. The PIS engine 112 may transmit the input response 174 back to the client system 104-1.

In this manner, the integration user 101-1 may define one or more parameterized integration pathway templates as appropriate, where each of the defined one or more parameterized integration templates are created by the PIS engine 112, and the created one or more parameterized integration templates are stored by the PIS engine 112 at the parameterized integration pathway templates 132 of the platform integration repository 114.

The integration user 101-1 may enter input including pre-configured trusted integration pathway task definition input(s) into the input 164-1. The pre-configured trusted integration pathway task definition input may include, for example, a pathway name, a pathway ID, and a particular task having a task name and a task ID. The pre-configured trusted integration pathway task definition input may also include one or more source entities associated with the pre-configured trusted integration pathway task, each source entity having an entity name, an entity ID, and one or more source systems having a system name, a system ID, and a system type, and one or more destination entities associated with the pre-configured trusted integration pathway task, each destination entity having an entity name, an entity ID, and one or more destination systems having a system name, a system ID, and a system type. The client system 104-1 may generate an input request 172 including at least the pre-configured trusted integration pathway task definition input(s). The client 104-1 may transmit the input request 172 to the PIS engine 112.

The PIS engine 112 may receive the input request 172 from the client 101-1. The PIS engine 112 may create a pre-configured trusted integration pathway task based on at least the pre-configured trusted integration pathway task definition input in the input request 172. The created pre-configured trusted integration pathway task may include, for example, a pathway name, a pathway ID, and a particular task having a task name and a task ID. The created pre-configured trusted integration pathway task may also include one or more source entities associated with the pre-configured trusted integration pathway task, each source entity having an entity name, an entity ID, and one or more source systems having a system name, a system ID, and a system type, and one or more destination entities associated with the pre-configured trusted integration pathway task, each destination entity having an entity name, an entity ID, and one or more destination systems having a system name, a system ID, and a system type. When the pre-configured trusted integration pathway task has been successfully created, the PIS engine 112 may store at least a pre-configured trusted integration pathway task name, a pre-configured trusted integration pathway task ID, and the pre-configured trusted integration pathway task at the pre-configured trusted integration pathways for tasks 134 of the platform integration repository 114. The PIS engine 112 may also generate an input response 174 including at least an indicator indicating that the pre-configured trusted integration pathway task has been successfully created. When the pre-configured trusted integration pathway task was not successfully created, the PIS engine 112 may generate an input response 174 including at least an indicator indicating that the pre-configured trusted integration pathway task was not successfully created. The PIS engine 112 may transmit the input response 174 back to the client system 104-1.

In this manner, the integration user 101-1 may define one or more pre-configured trusted integration pathways tasks as appropriate, where each of the defined one or more pre-configured trusted integration pathway task are created by the PIS engine 112, and the created one or more pre-configured trusted integration pathways tasks are stored by the PIS engine 112 at the pre-configured trusted integration pathways for tasks 134 of the platform integration repository 114.

The integration user 101-1 may enter input including parameterized integration pathway templates group input into the input 164-1. The parameterized integration pathway templates group input may include, for example, a pathway group name, a pathway group ID, a particular task having a task name and a task ID, and one or more parameterized integration pathway templates having a parameterized integration pathway template name and a parameterized integration pathway template ID that together achieve the particular task. The client system 104-1 may generate an input request 172 including at least the parameterized integration pathway templates group input. The client 104-1 may transmit the input request 172 to the PIS engine 112.

The PIS engine 112 may receive the input request 172 from the client 101-1. The PIS engine 112 may group the one or more parameterized integration pathway templates by the particular task that together achieve the particular task based on at least the parameterized integration pathway templates group input in the input request 172 to create parameterized integration pathway templates grouped by the particular task that together achieve the particular task. The parameterized integration pathway templates grouped by the particular task that together achieve the particular task may include, for example, the pathway group name, the pathway group ID, the particular task having the task name and the task ID, and the one or more parameterized integration pathway templates having the parameterized integration pathway template name and the parameterized integration pathway template ID that together achieve the particular task from the parameterized integration pathway templates group input. The PIS engine 112 may store at least the parameterized integration pathway templates grouped by the particular task including the pathway group name, the pathway group ID, the particular task having the task name and the task ID, and the one or more parameterized integration pathway templates having the parameterized integration pathway template name and the parameterized integration pathway template ID in the parameterized integration pathway templates grouped by task 136 of the platform integration repository 114. The PIS engine 112 may also generate an input response 174 including at least an indicator indicating that the parameterized integration pathway templates have been successfully grouped by the particular task. The PIS engine 112 may transmit the input response 174 back to the client system 104-1.

In this manner, the integration user 101-1 may group one or more parameterized integration pathway templates by another task as appropriate, where the one or more parameterized integration pathway templates grouped by the other task that together achieve the other task are created by the PIS engine 112, and the one or more parameterized integration pathway templates grouped by the other task are stored by the PIS engine 112 in the parameterized integration pathway templates grouped by task 136 of the platform integration repository 114.

The integration user 101-1 may enter input including at least PIS metadata definition input into the input 164-1. The PIS metadata definition input may include at least a set of human-understandable terms and PIS metadata. The PIS metadata definition input may also include a particular enterprise specific to the PIS metadata.

The set of human-understandable terms may include one or more of the following, as well as other suitable terms: one or more parameter names, one or more parameterized integration pathway template names associated with corresponding one or more parameterized integration pathway templates, one or more pathway names associated with corresponding one or more pre-configured trusted integration pathways for tasks, one or more pathway group names associated with corresponding one or more parameterized integration pathway templates grouped by task, one or more configurable trusted integration pathway names associated with corresponding one or more configurable trusted integration pathways, and one or more simplified trusted integration pathway names associated with corresponding one or more simplified trusted integration pathways. The one or more parameter names may include at least one of one or more tenant names, one or more source entity names, one or more destination entity names, one or more source system names, one or more source system types, one or more source data object names, one or more destination system names, one or more destination system types, one or more sender and receiver protocol names, one or more task names, one or more pathway group names, one or more configurable trusted integration pathway names, one or more format names, one or more query parameters, one or more mapping and transformation parameters, one or more recurrence parameters, or one or more other human-understandable terms as appropriate.

The PIS metadata may map the set of human-understandable terms to, for example, a corresponding set of at least one of one or more parameters, one or more parameterized integration pathway templates, one or more pre-configured trusted integration pathways for tasks, one or more parameterized integration pathway templates grouped by task, one or more configurable trusted integration pathways, and one or more simplified trusted integration pathways. The one or more parameters may include, in some instances, one or more tenants, one or more source entities, one or more destination entities, one or more source systems, one or more source data objects, one or more destination systems, one or more sender and receiver protocols, one or more tasks, one or more formats, one or more query parameters for each source data object that may be transferred, and one or more mappings and transformations for each source data object that may be transferred.

In one or more embodiments, for each parameter of the corresponding set of at least the one or more parameters, an integration pathway configuration may be provided. The integration pathway configuration may be configured as an empty configuration, where an end user may enter a value. The integration pathway configuration may also be configured as a set one value configuration, where the set one value configuration may be configured as a string or a dynamic calculation, and the set one value may not be visible to an end user. The integration pathway configuration may also be configured as a value list configuration, where a selection may be required by an end user and each value list entry may include a meaningful name, an ID, a value, an Xpath expression, a header attribute, an integration pathway script, a dynamic calculation during the integration pathway configuration, and a description, among others.

The client system 104-1 may generate an input request 172 including at least the PIS metadata definition input. The client 104-1 may transmit the input request 172 to the PIS engine 112.

The PIS engine 112 may receive the input request 172 from the client 101-1. The PIS engine 112 may create PIS metadata based on at least the PIS metadata definition input in the input request 172. The created PIS metadata may map the set of human-understandable terms to at least the corresponding set of the one of one or more parameters, the one or more parameterized integration pathway templates, the one or more pre-configured trusted integration pathways for tasks, the one or more parameterized integration pathway templates grouped by task, the one or more configurable trusted integration pathways, and the one or more simplified trusted integration pathways. The one or more parameters may include one or more tenants, one or more source entities, one or more destination entities, one or more source systems, one or more source data objects, one or more destination systems, one or more sender and receiver protocols, one or more tasks, one or more formats, one or more query parameters for each source data object that may be transferred, and one or more mappings and transformations for each source data object that may be transferred.

The PIS engine 112 may store at least the set of human-understandable terms and the created PIS metadata that may map the set of human-understandable terms to at least the corresponding set of at least the one of one or more parameters, the one or more parameterized integration pathway templates, the one or more pre-configured trusted integration pathways for tasks, the one or more parameterized integration pathway templates grouped by task, the one or more configurable trusted integration pathways, and the one or more simplified trusted integration pathways in the PIS metadata 138 of the platform integration repository 114. The PIS engine 112 may also generate an input response 174 including, for example, an indicator indicating that at least the PIS metadata has successfully been created and the set of human-understandable terms and the created PIS metadata successfully map the set of human-understandable terms. The PIS engine 112 may transmit the input response 174 back to the client system 104-1.

The integration user 101-1 may enter input including, for example, access control assignment input(s) into the input 164-1. The access control assignment input may include one or more roles, each role having a role name and a role ID, a particular set of parameterized PIS data to be assigned access control, access control to be assigned to at least a subset of the particular set of parameterized PIS data including access rights to be assigned to each role authorized to access a first subset of the particular set of the parameterized PIS data and usage rights to be assigned to each role authorized to use a second subset of the particular set of the parameterized PIS data, among others. The particular set of parameterized PIS data may include source entity data, source system data, destination entity data, destination system data, query data, format data, recurrence data, and a trusted integration pathway, for example. The query data may include a customer group, a sales region, and one or more source data object status. The one or more selectable source data object status may be, for example, New for a source data object that is new, Due for a source data object that is due, or Closed for a source data object that is closed. The format data may include a format of one or more destination data objects, where the queried data objects are transformed and mapped into the format of the one or more destination data objects. The client system 104-1 may generate an input request 172 including at least the access control assignment input. The client 104-1 may transmit the input request 172 to the PIS engine 112.

The PIS engine 112 may receive the input request 172 from the client 101-1. The PIS engine 112 may generate an ACM system request 180 including the access control assignment input in the input request 172. The PIS engine 112 may transmit the ACM system request 180 to the ACM system 106. The ACM system 106 may assign access control to at least the subset of the particular set of parameterized PIS data including assigning access rights to each role authorized to access the first subset of the particular set of the parameterized PIS data and assigning usage rights to each role authorized to use the second subset of the particular set of the parameterized PIS data. The ACM system 106 may store the assigned access control to at least the subset of the particular set of parameterized PIS data at the assigned access control 158 of the access control repository 150. The ACM system 106 may also store the assigned access rights to each role authorized to access the first subset of the particular set of the parameterized PIS data and the assigned usage rights to each role authorized to use the second subset of the particular set of the parameterized PIS data at the role data 156 of the access control repository 150. The ACM system 106 may generate an ACM system response 182 including at least an indicator indicating that the access control assignment has been successfully completed. The ACM system 106 may transmit the ACM system response 182 back to the PIS engine 112.

The PIS engine 112 may receive the ACM system response 182 from the ACM system 106. The PIS engine 112 may determine whether the access control assignment has been successfully completed based on at least the indicator in the ACM system response 182. When the indicator indicates that the access control assignment has been successfully completed, the PIS engine 112 may store the assigned access control to at least the subset of the particular set of parameterized PIS data at the assigned access control 128 of the PIS repository 114. The PIS engine 112 may also store the assigned access rights to each role authorized to access the first subset of the particular set of the parameterized PIS data and the assigned usage rights to each role authorized to use the second subset of the particular set of the parameterized PIS data at the role data 126 of the PIS repository 114. The PIS engine 112 may also generate an input response 174 including at least an indicator indicating that the access control assignment has been successfully completed. The PIS engine 112 may transmit the input response 174 back to the client system 104-1.

The integration user 101-1 may enter input including at least configurable integration pathway publish input into the input 164-1. The configurable integration pathway publish input may include a configurable trusted integration pathway based on a particular parameterized integration pathway template grouped by a particular task, the PIS metadata, and the assigned access control of the particular parameterized integration pathway template grouped by the particular task. The configurable integration pathway publish input may also include a configurable trusted integration pathway name, a configurable trusted integration pathway ID, a source system configuration having at least one of a source system configuration name and a source system configuration ID, an object query configuration having at least one of an object query configuration name and an object query configuration ID, an output format configuration having at least one of an output format configuration name and an output format configuration ID, and a destination system configuration having at least one of a destination system configuration name and a destination system configuration ID.

The client system 104-1 may generate an input request 172 including at least the configurable integration pathway publish input. The client 104-1 may transmit the input request 172 to the PIS engine 112.

The PIS engine 112 may receive the input request 172 from the client 101-1. The PIS engine 112 may create a configurable trusted integration pathway based on the particular parameterized integration pathway template grouped by the particular task, the PIS metadata, the assigned access control of the particular parameterized integration pathway template grouped by the particular task, the configurable trusted integration pathway name, the configurable trusted integration pathway ID, the source system configuration having at least one of the source system configuration name and the source system configuration ID, the object query configuration having at least one of the object query configuration name and the object query configuration ID, the output format configuration having at least one of the output format configuration name and the output format configuration ID, and the destination system configuration having at least one of the destination system configuration name and the destination system configuration ID. The PIS engine 112 may publish the created configurable trusted integration pathway. The PIS engine 112 may store the published configurable trusted integration pathway at the configurable trusted integration pathways 140 of the PIS repository 114. The PIS engine 112 may also generate an input response 174 including at least an indicator indicating that the configurable trusted integration pathway has been successfully published. The PIS engine 112 may transmit the input response 174 back to the client system 104-1.

In one or more embodiments, the integration user 101-1 may test the published configurable trusted integration pathway. A configuration UI may be simulated for the end user, the published configurable trusted integration pathway may be activated, and the integration user 101-1 may test the published configurable trusted integration pathway during runtime and checking the results.

In one or more embodiments, the integration user 101-1 may assign permissions to the published configurable trusted integration pathway. The assigned permissions may define which end users may have access rights, usage rights, or both access and usage rights to the published configurable trusted integration pathway. The assigned permissions may also define which integration users 101 may be able to maintain the published configurable trusted integration pathway.

In this manner, the integration user 101-1 may publish one or more other configurable trusted integration pathways, where the one or more other configurable trusted integration pathways are published by the PIS engine 112, and the one or more other published configurable trusted integration pathways are stored by the PIS engine 112 in the configurable trusted integration pathways 140 in the PIS repository 114.

In an example embodiment, during operation at runtime, or other appropriate time, a user 101 (e.g., end user 101-2) may initiate a process to create and deploy a simplified trusted integration pathway by, for example, loading and starting a client-side UI 162 on a client system 104, such as the UI 162-2 on the client system 104-2. The UI 162-2 may present, at the display 166 (e.g., display 166-2 of client system 104-2) a selection of one or more selectable requests for a corresponding lists of elements. Each selectable request for the corresponding lists of elements may be, for example, a selectable request for a corresponding list of systems, which may include one or more source systems and one of more destination systems, a selectable request for a corresponding list of configurable trusted integration pathways, or a selectable request for a corresponding list of source data objects. The end-user 101-2 may make a selection of a selectable request for a corresponding lists of elements. The client system 104-2 may generate a selection request 176 including the selection of the selectable request for the corresponding list of elements. The selection request 176 may also include user data associated with the end user-101-2, the user data may include a user name and role data including a role name. The client 104-1 may transmit the selection request 176 to the PIS engine 112 utilizing the UI 162-2 and the selection endpoint at the PIS engine 112.

The PIS engine 112 may receive the selection request 176 from the client system 104-2 at the selection endpoint. The PIS engine 112 may identify the end user 101-2 interacting with the PIS system 102. The PIS engine 112 may determine a set of identity information associated with the end user 101-2, which may include, for example, the user data associated with the end user-101-2 including the user name and the role data including the role name in the received selection request 176. The PIS engine 112 may match user data at the user data 124 and role data at the role data 126 of PIS repository 114 with the user data associated with the end user-101-2 including the user name and the role data including the role name in the received selection request 176 based on the PIS metadata 138 at PIS repository 114. The set of identity information associated with the end user 101-2 may also include the matching user data at the user data 124 and the matching role data at the role data 126.

Based on the set of identity information associated with the end user 101-2, the PIS engine 112 may determine a set of elements corresponding to the selection of the selectable request in the selection request 176 that is the set of elements for which the end user 101-2 is authorized. Determining the set of elements for which the end user 101-2 is authorized may include determining each element in the set of elements that the end user 101-2 has assigned access control at the assigned access control 128 of the PIS repository 114, which may include assigned rights to access the element, assigned usage rights to use the element, or both assigned access rights and assigned usage rights, and may be based on the matching role data at the role data 126 associated with the end user 101-2, and the PIS metadata 138. Determining each element in the set of elements for which the end user 101-2 is authorized may include, for example, determining each system in a set of systems, each configurable trusted integration pathway in a set of configurable trusted integration pathways, or each source data object that the end user 101-2 has assigned access control at the assigned access control 128, which may include assigned rights to access the system, the configurable trusted integration pathway, or the source data object, assigned usage rights to use the system, the configurable trusted integration pathway, or the source data object, or both the assigned access rights and the assigned usage rights, and may be based on the matching role data at the role data 126 associated with the end user 101-2, the PIS metadata 138, the list of the systems at the system data 130, the list of configurable trusted integration pathway at the configurable trusted integration pathways 140, and the list of source data objects of each system in the list of systems at the system data 130.

The PIS engine 112 may create the requested list of elements corresponding to the selected request in the selection request 176 including the set of elements for which the end user 101-2 is authorized, where each element of the set of elements may include the associated element name. Creating the requested list of elements for which the end user 101-2 is authorized may include, for example, creating the requested list of systems including the set of systems, the list of configurable trusted integration pathways including the set of configurable trusted integration pathways, or the list of source data objects including the set of source data objects for which the end user 101-2 is authorized, where each system of the set of systems may include the associated system name, each configurable trusted integration pathway of the set of configurable trusted integration pathway may include the associated configurable trusted integration pathway name, or each source data object of the set of source data objects may include the associated source data object name. The PIS engine 112 may generate a selection response 178 including the requested list of elements corresponding to the selected request. The PIS engine 112 may transmit the selection response 178 back to the client system 104-2.

The client system 104-2 may receive the selection response 178 from the PIS engine 112 and the UI 162-2 may provide the requested list of elements corresponding to the selected request in the selection response 178 at the display output 116-2 as one or more selectable corresponding element names. For example, if the requested list is the list of the systems, the UI 162-2 may provide the one or more system names of the requested list of systems in the selection response 178 at the display output 116-2 as one or more selectable system names. If the requested list is the list of the configurable trusted integration pathways, the UI 162-2 may provide the one or more configurable trusted integration pathway names of the requested list of configurable trusted integration pathways in the selection response 178 at the display output 116-2 as one or more selectable configurable trusted integration pathway names. If the requested list is the list of the source data objects, the UI 162-2 may provide the one or more source data object names of the requested list of source data objects in the selection response 178 at the display output 166-2 as one or more selectable source data object names. As a result, only the one or more selectable element names corresponding to the requested list of elements that the end user 101-2 has assigned access control are provided at the display output 166-2.

The end user 101-2 may select a configurable trusted integration pathway name associated with a configurable trusted integration pathway from the one or more selectable configurable trusted integration pathways, select a source system name associated with a source system from the one or more selectable system names, select a destination system associated with a destination system from the one or more selectable system names, and select a source data object name associated with a source data object from the one or more selectable source data object names. The end user 101-2 may filter the configurable trusted integration pathway based on one or more of the selected configurable trusted integration pathway name, the selected source system name, the selected destination system name, or the selected source data object name. The client system 104-2 may generate a selection request 176 including the one or more of the selected configurable trusted integration pathway name, the selected source system name, the selection destination system name, or the selected source data object name. The selection request 176 may also include the user data associated with the end user-101-2. The client system 104-2 may transmit the selection request 176 to the PIS engine 112.

The PIS engine 112 may receive the selection request 176 from the client 101-2. The PIS engine 112 may filter the configurable trusted integration pathway to a particular filtered configurable trusted integration pathway based on the PIS metadata 138 and the one or more of the selected configurable trusted integration pathway name associated with the selected configurable trusted integration pathway, the source system associated with the selected source system name, the destination system associated with the selected destination system name, and the source data object associated with the selected source data object name. The PIS engine 112 may use the PIS metadata 138 to map between the selected configurable trusted integration pathway name and the selected configurable trusted integration pathway, map between the selected source system name and the associated source system, map between the selected destination system name and the associated destination system, and map between the selected source data object name and the associated source data object. The PIS engine 112 may utilize the PIS metadata 138 to map between a source system configuration including one or more associated parameters associated with the particular filtered configurable trusted integration pathway and a source system configuration name including one or more associated parameter names as a selectable source system configuration name and one or more selectable associated parameter names, map between an object query configuration including one or more associated parameters associated with the particular filtered configurable trusted integration pathway and an object query configuration name including one or more associated parameter names as a selectable object query configuration name and one or more selectable associated parameter names, map between an output format configuration including one or more associated parameters associated with the particular filtered configurable trusted integration pathway and an output format configuration name including one or more associated parameter names as a selectable output format configuration name and one or more selectable associated parameter names, map between a destination system configuration including one or more associated parameters associated with the particular filtered configurable trusted integration pathway and a destination system configuration name including one or more associated parameter names as a selectable destination system configuration name and one or more selectable associated parameter names.

The PIS engine 112 may generate a selection response 178 including the selectable particular filtered configurable trusted integration pathway name, the selectable source system configuration name and the one or more selectable associated parameter names associated with the source system, the selectable object query configuration name and the one or more selectable associated parameter names associated with the source data object, the selectable output format configuration name and the one or more selectable associated parameter names, and the selectable destination system configuration name and the one or more selectable associated parameter names associated with the destination system. The PIS engine 112 may transmit the selection response 178 back to the client system 104-2.

The client system 104-2 may receive the selection response 178 from the PIS engine 112 and may provide one or more of the selectable particular filtered configurable trusted integration pathway name, the selectable source system configuration name and the one or more selectable associated parameter names associated with the source system, the selectable object query configuration name and the one or more selectable associated parameter names associated with the source data object, the selectable output format configuration name and the one or more selectable associated parameter names, or the selectable destination system configuration name and the one or more selectable associated parameter names associated with the destination system in the selection response 178 at the display output 166-2.

Figure 2:
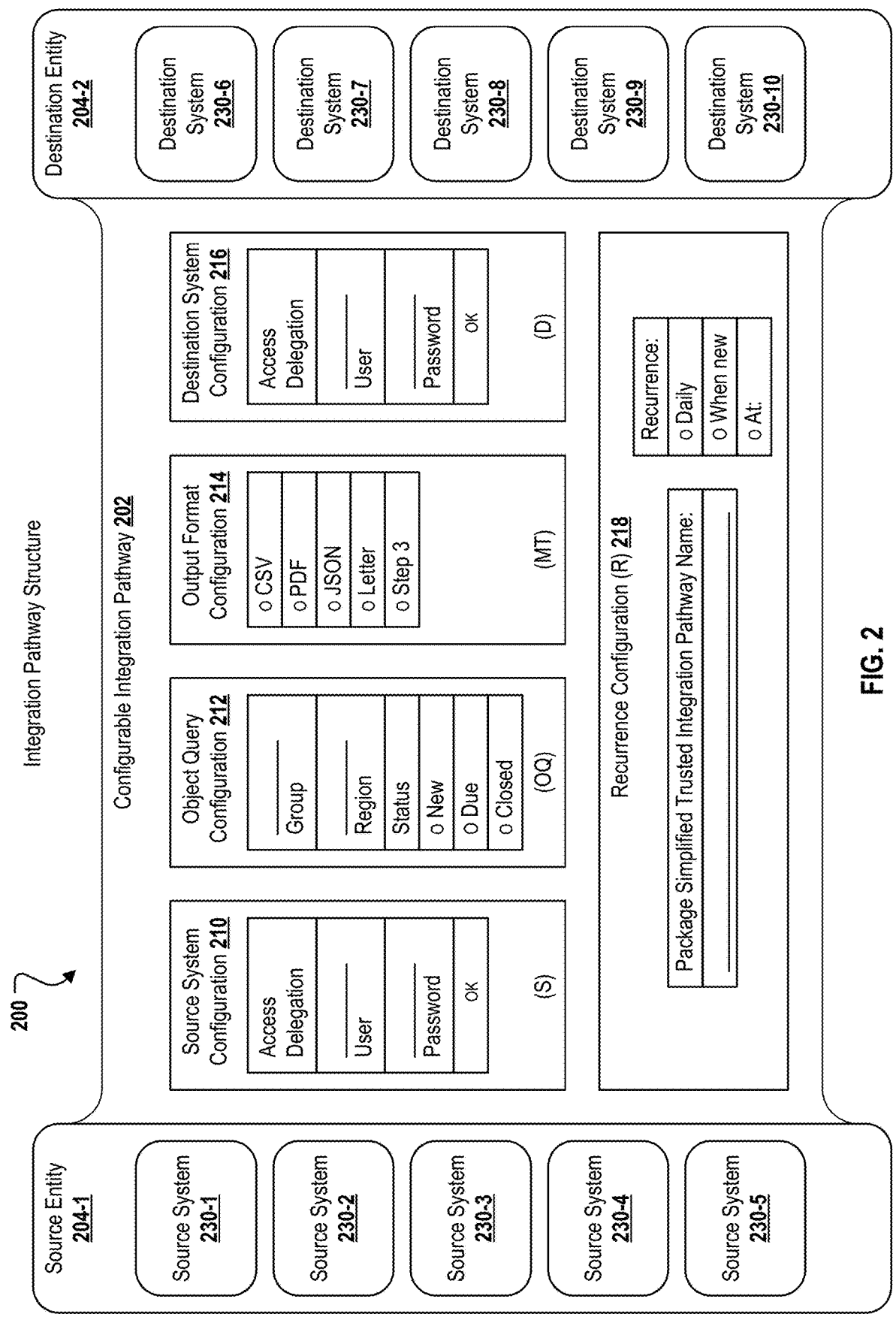
FIG. 2 is a block diagram illustrating an example integration pathway structure of a configurable integration pathway, according to an implementation of the present disclosure.

FIG. 2 is a block diagram illustrating an example integration pathway structure 200, according to an implementation of the present disclosure. The illustrated integration pathway structure 200 includes configurable integration pathway 202, a source entity 204-1 having source systems 230 including source systems 230-1, 230-2, 230-3, 230-4, and 230-5, and a destination entity 204-2 having destination systems 230 including destination systems 230-6, 230-7, 230-8, 230-9, and 230-10. The illustrated configurable integration pathway 202 includes a source system configuration 210, an object query configuration 212, an output format configuration 214, a destination system configuration 216, and a recurrence configuration 218. As shown, the source system configuration 210 includes configurable access delegation parameters including a user parameter entry, a password parameter entry, and an OK button or element that may be selected or activated when the user and password parameters are successfully entered. In one or more example embodiments, the source system configuration 210 may include one or more other system configuration parameters. The object query configuration 212 may include a group parameter entry, a region parameter entry, and a selectable status of the one or more source data objects to be queried include a New status, a Due status, and a Closed status. In one or more example embodiments, the object query configuration 212 may include one or more other object query configuration parameters. The output format configuration 214 may include a list of selectable output formats that the one or more queried source data objects are to be transformed and mapped into when moved to the destination system. The output formats can be of any type including, for example, industry standard type output formats, enterprise specific type output formats, or any other type of output formats. As shown, the selectable output format parameters include a comma-separated values (CSV) format, a portable document format (PDF), a JavaScript object notation (JSON) format, a Letter format, and a Step 3 format. The selectable output format parameters may also include one or more other formats. Similar to the source system configuration 210, the destination system configuration 216 includes configurable access delegation parameters including a user parameter entry, a password parameter entry, and an OK entry that may be selected when the user and password parameters are successfully entered. In one or more example embodiments, the destination system configuration 216 may include one or more other system configuration parameters. The illustrated recurrence configuration 218 may include a package simplified trusted integration pathway name entry, and a list of selectable recurrence parameters for a recurreable execution of the configurable integration pathway 202 during runtime. The list of selectable recurrence parameters include a daily recurrence parameter, a when new recurrence parameter, an at particular times recurrence parameter, or an at an occurrence of a particular event recurrence parameter. One or more other recurrence configuration parameters may also be utilized.

Referring back to FIG. 1, the end user 101-2 may configure the particular filtered configurable trusted integration pathway to create a simplified trusted integration pathway that meets the particular requirements and needs of the end user 101-2. The end user 101-2 may make a first series of selections to select a source system configuration name and one or more associated parameter names associated with the selected source system from the selectable source system configuration name and the one or more selectable associated parameter names associated with the source system to configure the source system configuration. For example, as shown in FIG. 1, the end user 101-2 may enter a user name, a password, and select OK to provide access delegation to the source system configuration 210 associated with the selected source system.

The end user 101-2 may make a second series of selections to select an object query configuration name and one or more associated parameter names associated with the source data object from the selectable object query configuration name and the one or more selectable associated parameter names associated with the source data object to configure the object query configuration. For example, as shown in FIG. 1, the end user 101-2 may enter a group name, a region name, and make a selection of one or more selectable source data object status. The one or more selectable source data object status may be, for example, New for a source data object that is new, Due for a source data object that is due, or Closed for a source data object that is closed.

The end user 101-2 may make a third series of selections to select an output format configuration name and the one or more associated parameter names from the selectable output format configuration name and the one or more selectable associated parameter names to configure an output format configuration. For example, as shown in FIG. 1, the end user 101-2 may select one of the selectable output formats including the CSV format, the PDF format, the JSON format, the Letter format, or the Step 3 format that one or more queried source data objects are to be transformed and mapped into when the one or more queried source data objects are moved from the selected source system to the selected destination system. The selectable output formats can be of any type including, for example, industry standard type output formats, enterprise specific type output formats, or any other type of output formats. The underlying platform integration system engine 112 provides functionality to handle any of the respective format definitions.

The end user 101-2 may make a fourth series of selections to select a destination system configuration name and one or more associated parameter names associated with the selected destination system from the selectable destination system configuration name and the one or more selectable associated parameter names associated with the destination system to configure the destination system configuration. For example, as shown in FIG. 1, the end user 101-2 may enter a user name, a password, and select OK to provide access delegation to the destination system configuration 210 associated with the selected destination system.

The client system 104-2 may generate a selection request 176 including the selected particular filtered configurable trusted integration pathway name, the selected source system configuration name and the selected one or more associated parameter names to configure the source system configuration, the selected object query configuration name and the selected one or more associated parameter names to configure the object query configuration, the selected output format configuration name and the selected one or more selectable associated parameter names to configure the output format configuration, and the selected destination system configuration name and the selected one or more associated parameter names to configure the destination system configuration. The selection request 176 may also include the user data associated with the end user 101-2. The client system 104-2 may transmit the selection request 176 to the PIS engine 112.

The PIS engine 112 may receive the selection request 176 from the client system 104-2. The PIS engine 112 may use the PIS metadata 138 to map the selected particular filtered configurable trusted integration pathway name to the particular filtered configurable trusted integration pathway, map the selected source system configuration name and the selected one or more associated parameter names to the selected source system configuration and the selected one or more associated parameters, map the selected object query configuration name and the selected one or more associated parameter names to the selected object query configuration and the selected one or more associated parameters, map the selected output format configuration name and the selected one or more selectable associated parameter names to the selected output format configuration and the selected one or more selectable associated parameters, and map the selected destination system configuration name and the selected one or more associated parameter names to the selected destination system configuration and the selected one or more associated parameters.

The PIS engine 112 may configure the particular filtered configurable trusted integration pathway to create the simplified trusted integration pathway based on the selected source system configuration and the selected one or more associated parameters, the selected object query configuration and the selected one or more associated parameters, the selected output format configuration and the selected one or more selectable associated parameters, and the selected destination system configuration and the selected one or more associated parameters. The PIS engine 112 may use the PIS metadata 138 to map the created simplified trusted integration pathway to the simplified trusted integration pathway name, and map a selectable recurrence configuration and one or more selectable associated parameters associated with the simplified trusted integration pathway to a selectable recurrence configuration name and one or more selectable associated parameter names associated with the simplified trusted integration pathway. The PIS engine 112 may generate a selection response 178 including at least the simplified trusted integration pathway name and the selectable recurrence configuration name and the one or more selectable associated parameter names associated with the simplified trusted integration pathway. The PIS engine 112 may transmit the selection response 178 back to the client system 104-2.

The client system 104-2 may receive the selection response 178 from the PIS engine 112 and may provide at least the simplified trusted integration pathway name, and the selectable recurrence configuration name and the one or more selectable associated parameter names associated with the simplified trusted integration pathway in the selection response 178 at the display output 166-2. The end user 101-2 may select a recurrence configuration name and one or more associated parameter names associated with the simplified trusted integration pathway name from the selectable recurrence configuration name and the one or more selectable associated parameter names associated with the simplified trusted integration pathway. For example, as shown in FIG. 1, the end user 101-2 may select a recurrence configuration name from the selectable recurrence configuration name, enter a package simplified trusted integration pathway name, and select one or more selectable recurrence parameters including a daily recurrence parameter, a when new recurrence parameter, and an At parameter. The client system 104-2 may generate a selection request 176 including the simplified trusted integration pathway name, the selected recurrence configuration name, and the selected one or more associated parameter names associated with the simplified trusted integration pathway name to package the simplified trusted integration pathway. The selection request 176 may also include the user data associated with the end user-101-2. The client system 104-2 may transmit the selection request 176 to the PIS engine 112.

The PIS engine 112 may receive the selection request 176 from the client system 104-2. The PIS engine 112 may use the PIS metadata 138 to map the simplified trusted integration pathway name to the simplified trusted integration pathway and map the selected recurrence configuration name and the selected one or more associated parameter names to the selected recurrence configuration and the selected one or more associated parameters. The PIS engine 112 may configure the simplified trusted integration pathway based on the selected recurrence configuration and the selected one or more associated parameters. The PIS engine 112 may package the configured simplified trusted integration pathway to create the packaged simplified trusted integration pathway. The PIS engine 112 may use the PIS metadata 138 to map the packaged simplified integration pathway to a packaged simplified trusted integration pathway name. The PIS engine 112 may generate a selection response 178 including at least the packaged simplified trusted integration pathway and the packaged simplified trusted integration pathway name. The PIS engine 112 may transmit the selection response 178 back to the client system 104-2.

The client system 104-2 may receive the selection response 178 from the PIS engine 112 and may provide at least the packaged simplified trusted integration pathway name in the selection response 178 at the display output 166-2 using the UI 162-2. The end user 101-2 may verify the packaged simplified trusted integration pathway by loading the packaged simplified trusted integration pathway and running the loaded simplified packaged simplified trusted integration pathway to check that the simplified trusted integration pathway performs as expected. Once the simplified trusted integration pathway has been verified, the end user 101-2 may deploy the simplified trusted integration pathway. The simplified trusted integration pathway may be run from either a standalone application or from an existing application already being used by the end user 101-2.

Figure 3:
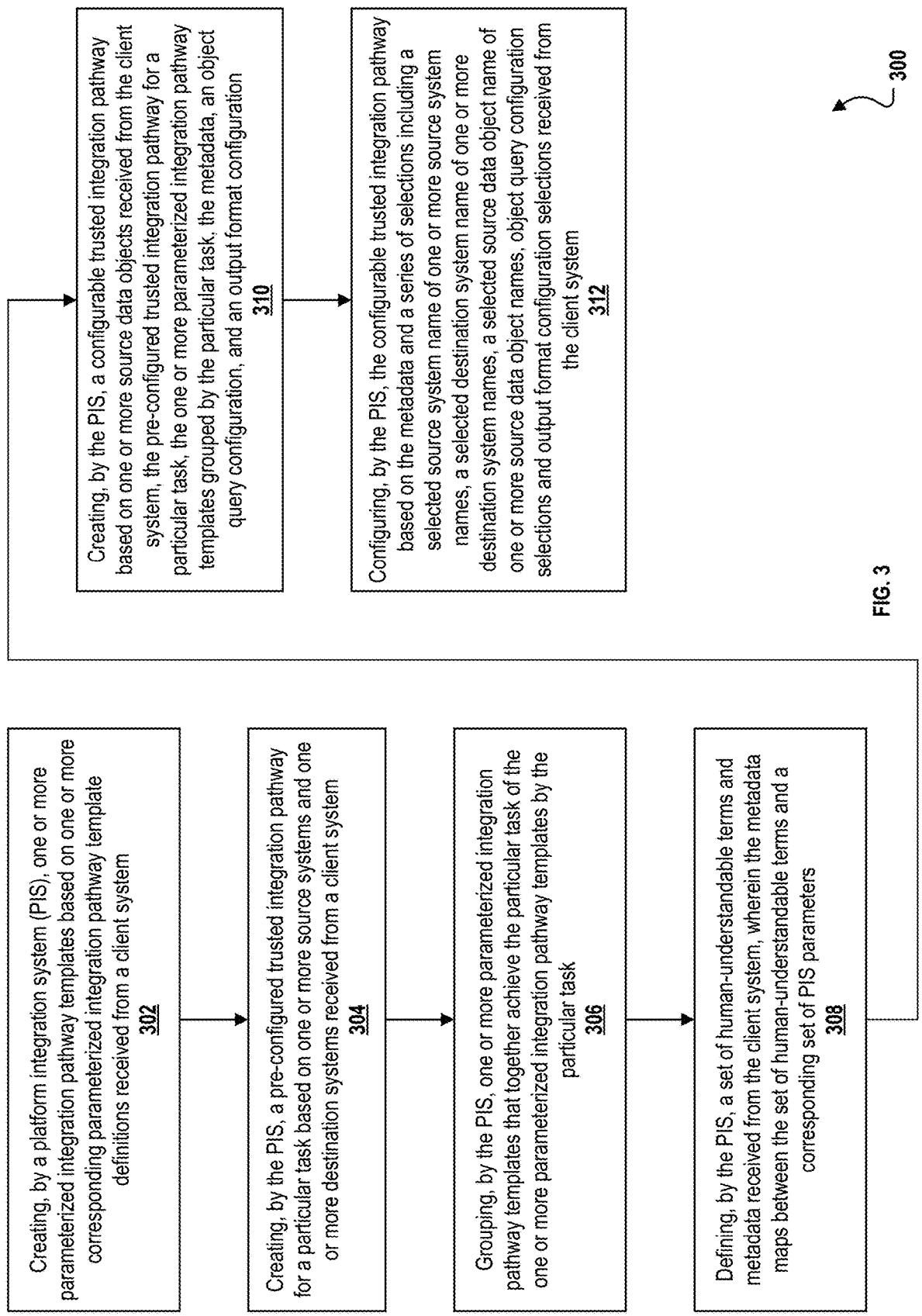
FIG. 3 is a flowchart illustrating an example of a computer-implemented method for providing end user creation of trusted integration pathways between different enterprise systems, according to an implementation of the present disclosure.

FIG. 3 is a flowchart illustrating an example of a computer-implemented method 300 for providing end user creation of trusted integration pathways between different enterprise systems, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, one or more parameterized integration pathway templates is created, by a platform integration system (PIS), based on one or more corresponding parameterized integration pathway template definitions received from a client system. In some implementations, the one or more corresponding parameterized integration pathway template definitions comprises one or more corresponding particular sender and receiver protocols and one or more corresponding particular mapping for a source structure and a destination structure. From 302, method 300 proceeds to 304.

At 304, a pre-configured trusted integration pathway for a particular task is created, by the PIS, based on one or more source systems and one or more destination systems received from a client system. From 304, method 300 proceeds to 306.

At 306, one or more parameterized integration pathway templates that together achieve the particular task of the one or more parameterized integration pathway templates by the particular task is grouped, by the PIS. From 306, method 300 proceeds to 308.

At 308, a set of human-understandable terms and metadata received from the client system is defined, by the PIS, where the metadata maps between the set of human-understandable terms and a corresponding set of PIS parameters. In some implementations, the corresponding set of PIS parameters comprises one or more tenants, one or more entities, one or more systems including one or more source systems and one or more destination systems, one or more system types, one or more data objects including one or more source data objects and one or more destination data objects, one or more sender and receiver protocols, one or more query parameters for each of the one or more source data objects to be transferred, and one or more mappings and transformations for each of the one or more source data objects to be transferred. From 308, method 300 proceeds to 310.

At 310, a configurable trusted integration pathway is created, by the PIS, based on one or more source data objects received from the client system, the pre-configured trusted integration pathway for a particular task, the one or more parameterized integration pathway templates grouped by the particular task, the metadata, an object query configuration, and an output format configuration. From 310, method 300 proceeds to 312.

At 312, the configurable trusted integration pathway is configured, by the PIS, based on the metadata and a series of selections including a selected source system name of one or more source system names, a selected destination system name of one or more destination system names, a selected source data object name of one or more source data object names, object query configuration selections and output format configuration selections received from the client system. In some implementations, prior to configuring the configurable trusted integration pathway, access control to the one or more source systems, the one or more source data objects, the configurable trusted integration pathway, and the one or more destination systems including assigning access rights to each role authorized to access the one or more source systems, the one or more source data objects, the configurable trusted integration pathway and assigning usage rights to each role authorized to use the one or more destination systems is assigned. In some implementations, configuration of the configurable trusted integration pathway further comprises: user data including role data having a role name and associated with an end user of the client system is received; the metadata is used to map: the role name to a role associated with the end user; the one or more source system names to the one or more source systems; the one or more destination system names to the one or more destination systems; and the one or more source data object names to the one or more source data objects; and whether the role associated with the end user has assigned access rights to access the one or more source systems, the one or more destination systems, and the one or more source data objects and has assigned usage rights to use the one or more destination systems is determined. In some implementations, configuration of the configurable trusted integration pathway is further based on a second series of selections including source system configuration selections and destination system configuration selections received from the client system. In some implementations, a trusted integration pathway is created based on at least a configured trusted integration pathway name received from the client system, the metadata, and the configured trusted integration pathway; and the trusted integration pathway is packaged based on recurrence configuration selections received from the client system and the metadata. After 312, method 300 stops.

Figure 4:
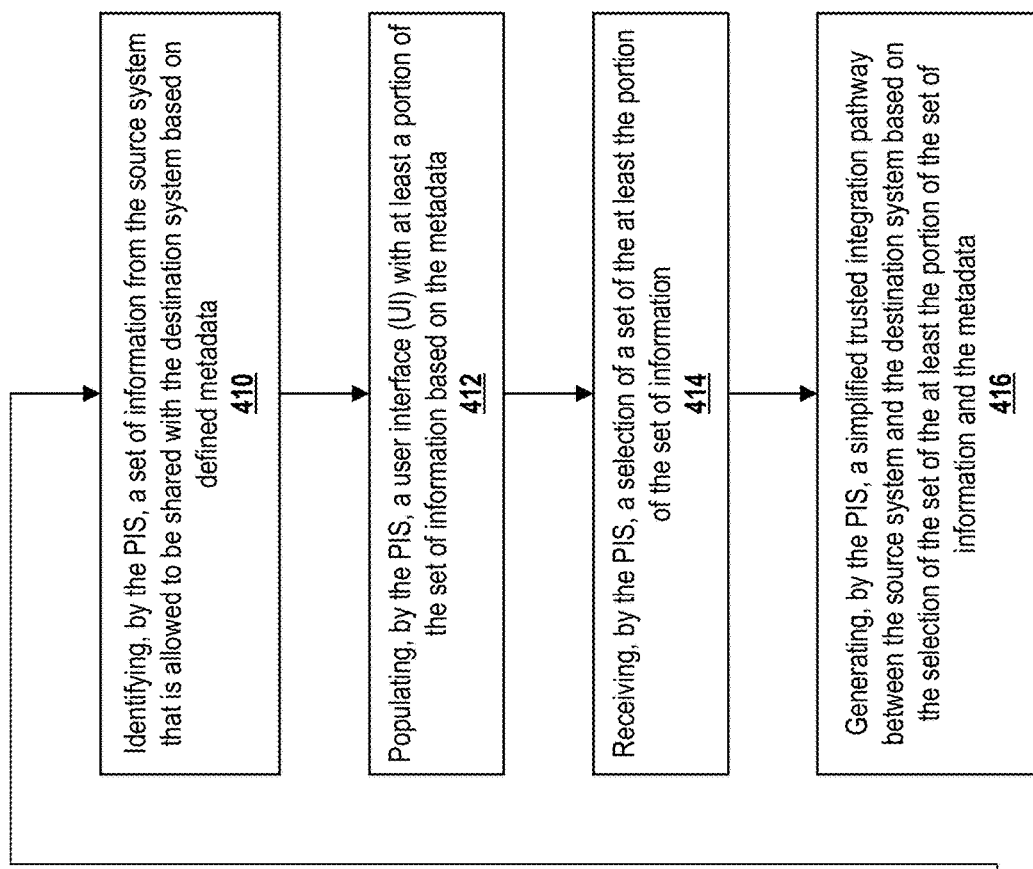
FIG. 4 is a flowchart illustrating an example of a computer-implemented method for end user creation of trusted integration pathways between different enterprise systems, according to an implementation of the present disclosure.

FIG. 4 is a flowchart illustrating an example of a computer-implemented method 400 for end user creation of trusted integration pathways between different enterprise systems, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, an end user interacting with a platform integration system (PIS) is identified, by the PIS. From 402, method 400 proceeds to 404.

At 404, a set of identity information associated with the end user is determined, by the PIS. From 404, method 400 proceeds to 406.

At 406, based on the set of identify information, a set of systems and a set of configurable trusted integration pathways that the end user is authorized to create a trusted integration pathway between two systems is determined, by the PIS. From 406, method 400 proceeds to 408.

At 408, a selection of a source system and a destination system from the set of systems is received, by the PIS. From 408, method 400 proceeds to 410.

At 410, a set of information from the source system that is allowed to be shared with the destination system based on pre-defined metadata is identified, by the PIS. From 410, method 400 proceeds to 412.

At 412, a user interface (UI) with at least a portion of the set of information based on the pre-defined metadata is populated, by the PIS. In some implementations, the pre-defined metadata maps between a set of human-understandable terms and corresponding set of PIS parameters, and the corresponding set of PIS parameters comprises one or more tenants, one or more entities, one or more systems including one or more source systems and one or more destination systems, one or more system types, one or more data objects including one or more source data objects and one or more destination data objects, one or more sender and receiver protocols, one or more query parameters for each of the one or more source data objects to be transferred, and one or more mappings and transformations for each of the one or more source data objects to be transferred. From 412, method 400 proceeds to 414.

At 414, a selection of a set of the at least the portion of the set of information is received, by the PIS. In some implementations, the selection of the set of the at least the portion of the set of information comprises a source data object and associated object query configuration information, and during execution of the trusted integration pathway, the set of information is queried from the source system and shared with the destination system based on the source data object and the associated object query configuration information. In some implementations, the selection of the set of the at least the portion of the set of information comprises output format configuration information, and during execution of the trusted integration pathway, the set of information from the source system is mapped and transformed to a format supported by the destination system based on the output format configuration information. In some implementations, the selection of the set of the at least the portion of the set of information comprises source system configuration information and destination system configuration information, and wherein, during execution of the trusted integration pathway, access to the source system and the destination system is delegated based on the corresponding source system configuration information and destination system configuration information. From 414, method 400 proceeds to 416.

At 416, a trusted integration pathway between the source system and the destination system is generated, by the PIS, based on the selection of the set of the at least the portion of the set of information and the pre-defined metadata. In some implementations, a selection of a configurable trusted integration pathway of the set of configurable trusted integration pathways is received, where generation of the trusted integration pathway between the source system and the destination system is further based on the selection of the configurable trusted integration pathway. In some implementations, a selection of a set of recurrence configuration information that specifies when execution of a packaged trusted integration pathway between the source system and the destination system is to occur is received. In some implementations, the packaged trusted integration pathway between the source system and the destination system is generated based on the trusted integration pathway between the source system and the destination system and the selection of the set of recurrence configuration information. After 416, method 400 stops.

Figure 5:
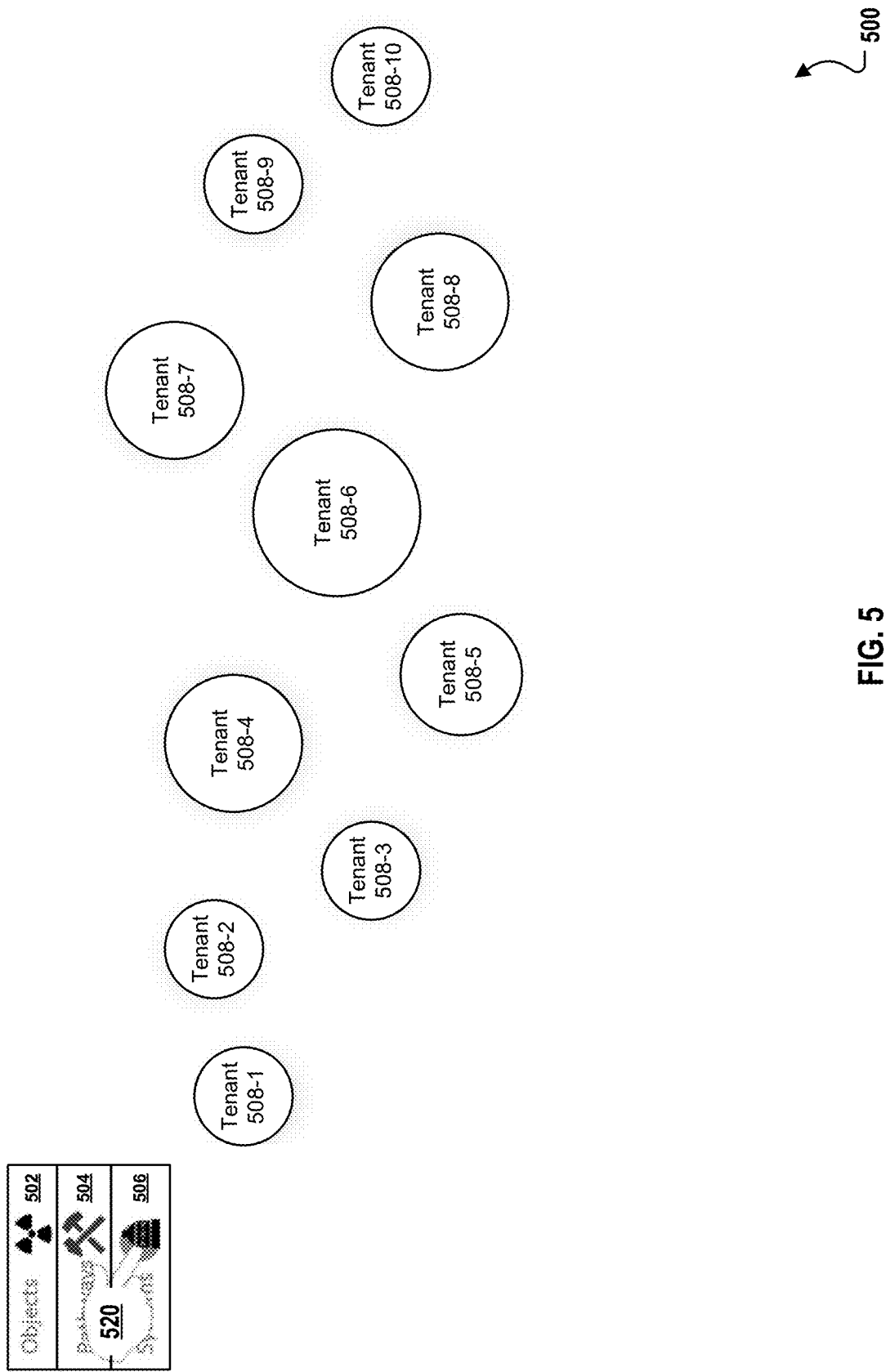
FIG. 5 is a partial screenshot of an example user interface for end user creation of trusted integration pathways between different enterprise systems illustrating system selection functionality, according to an implementation of the present disclosure.

FIG. 5 is a partial screenshot of an example UI 500 for end user creation of trusted integration pathways between different enterprise systems illustrating system selection functionality, according to an implementation of the present disclosure. On the left side, the UI 500 permits an end user, such as, end user 101-2 (with reference to FIG. 1), to select objects 502, pathways 504, or systems 506. In response to a selection 520 of selectable systems 506, the user interface 500 is populated with selectable tenant systems 508, including tenant systems 508-1 through 508-10, for which the end user is authorized to create trusted integration pathways between different enterprise systems based on a set of identity information associated with the end user 101-2.

Figure 6:
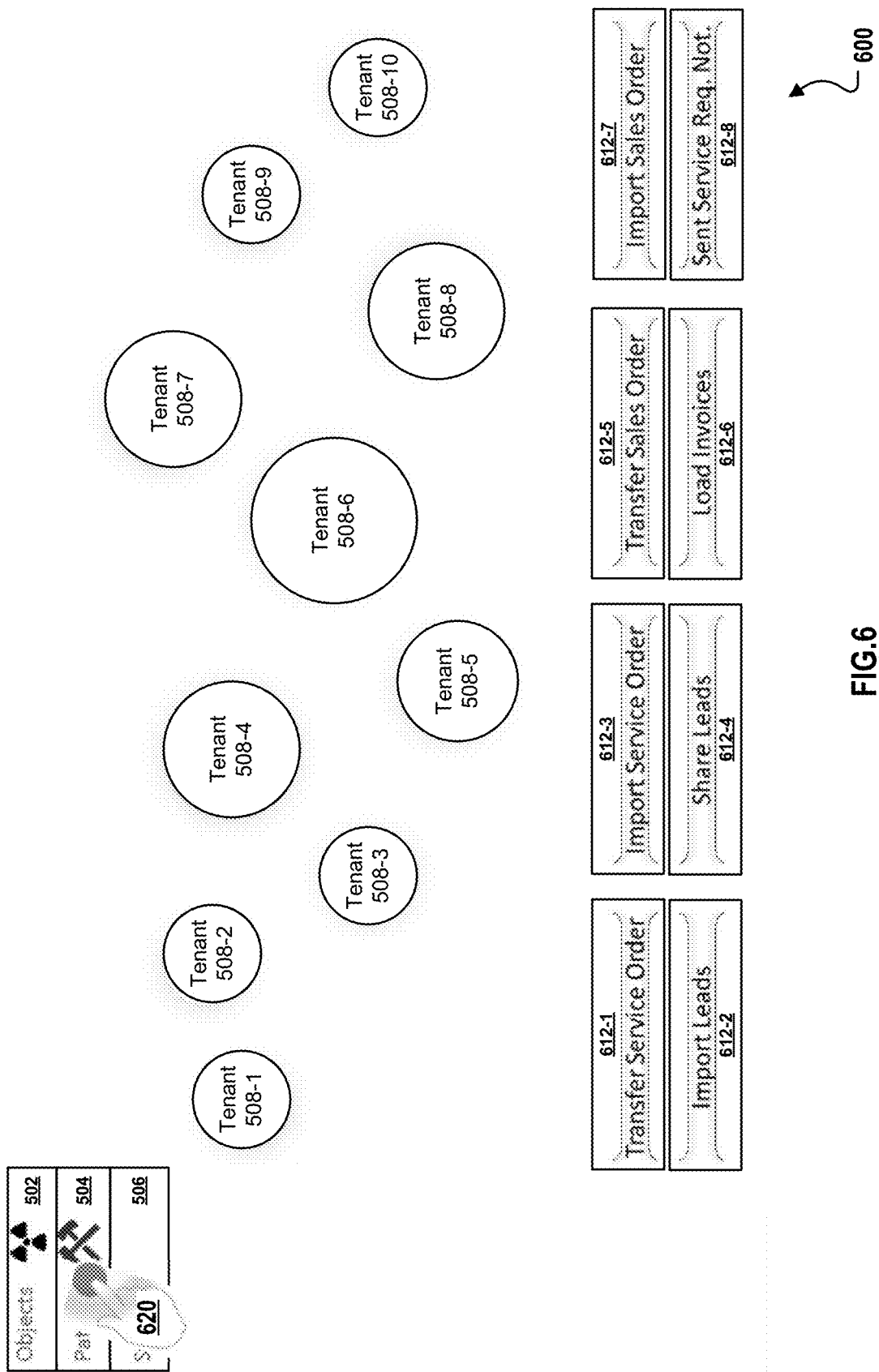
FIG. 6 is a partial screenshot of an example populated user interface illustrating pathway selection functionality, according to an implementation of the present disclosure.

FIG. 6 is a partial screenshot of an example populated UI 600 illustrating pathway selection functionality, according to an implementation of the present disclosure. As shown, UI 600 is populated with the selectable tenant systems 508 previously selected in FIG. 5. In response to a selection 620 of selectable pathways 504, the UI 600 is further populated with selectable pathways for particular tasks 612, including a pathway for a particular task 612-1 through 612-8, for which the end user is authorized to create trusted integration pathways between different enterprise systems based on the set of identity information associated with the end user 101-2.

Figure 7:
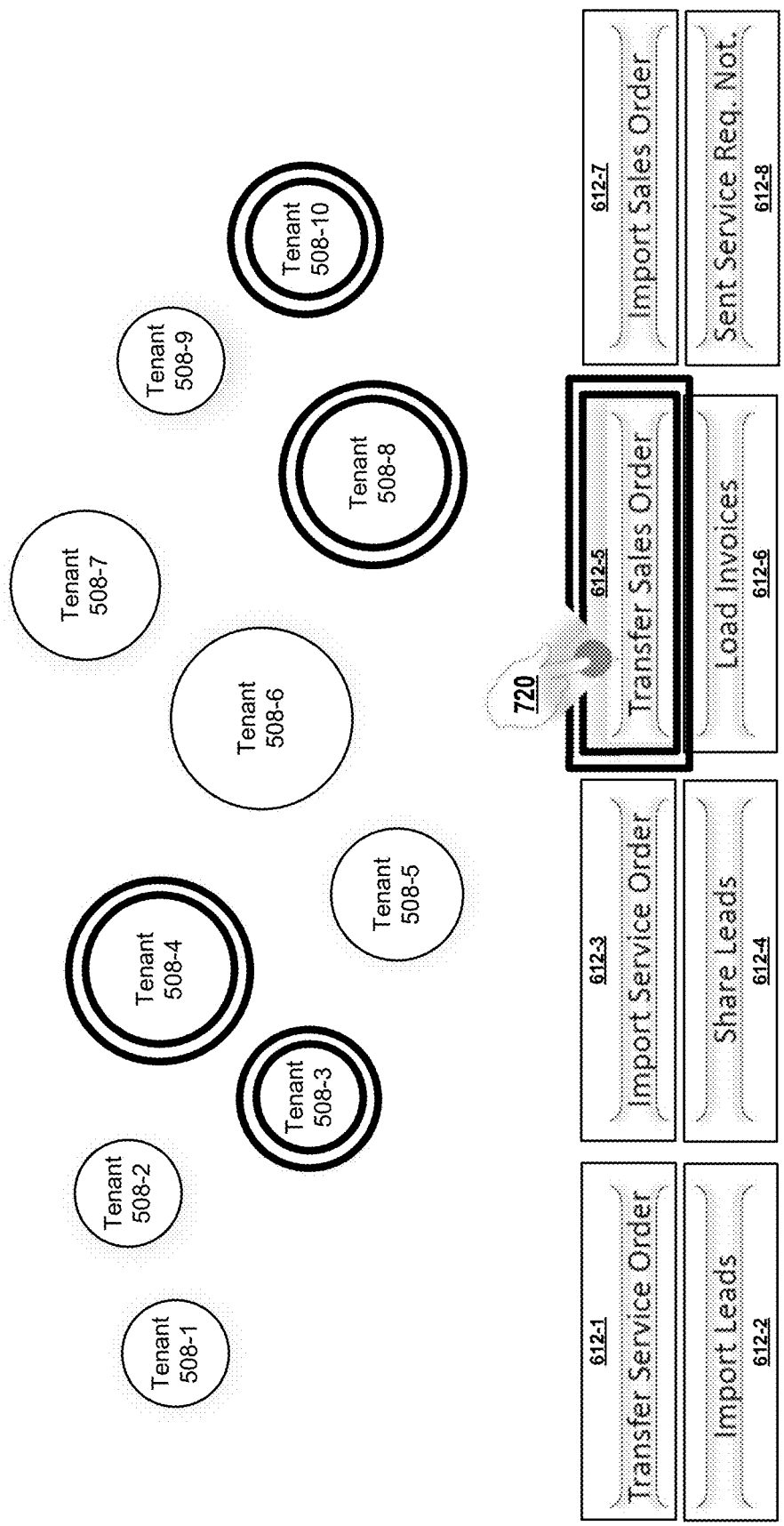
FIG. 7 is a partial screenshot of an example populated user interface illustrating particular pathway and task selection functionality, according to an implementation of the present disclosure.

FIG. 7 is a partial screenshot of an example populated UI 700 illustrating pathway for a particular task selection functionality, according to an implementation of the present disclosure. In response to a selection 720 of the selectable pathway for the particular task 612-5, the UI 700 is populated with an indicator indicating the selection of the selected pathway for the particular task 612-5, indicators indicating that the selectable tenant systems 508-3, 508-4, 508-8, and 508-10 may be connected using the selected pathway for the particular task 612-5, the other selectable pathways for the particular tasks 612, and the other selectable tenant systems 508. In the illustration of UI 700, the selected pathway for the particular task 612-5 may be used to transfer sales orders from at least one of the selectable tenant systems 508-3, 508-4, 508-8, and 508-10 as source tenant systems 508 to at least one of the selectable tenant systems 508-3, 508-4, 508-8, and 508-10 as destination tenant systems 508.

Figure 8:
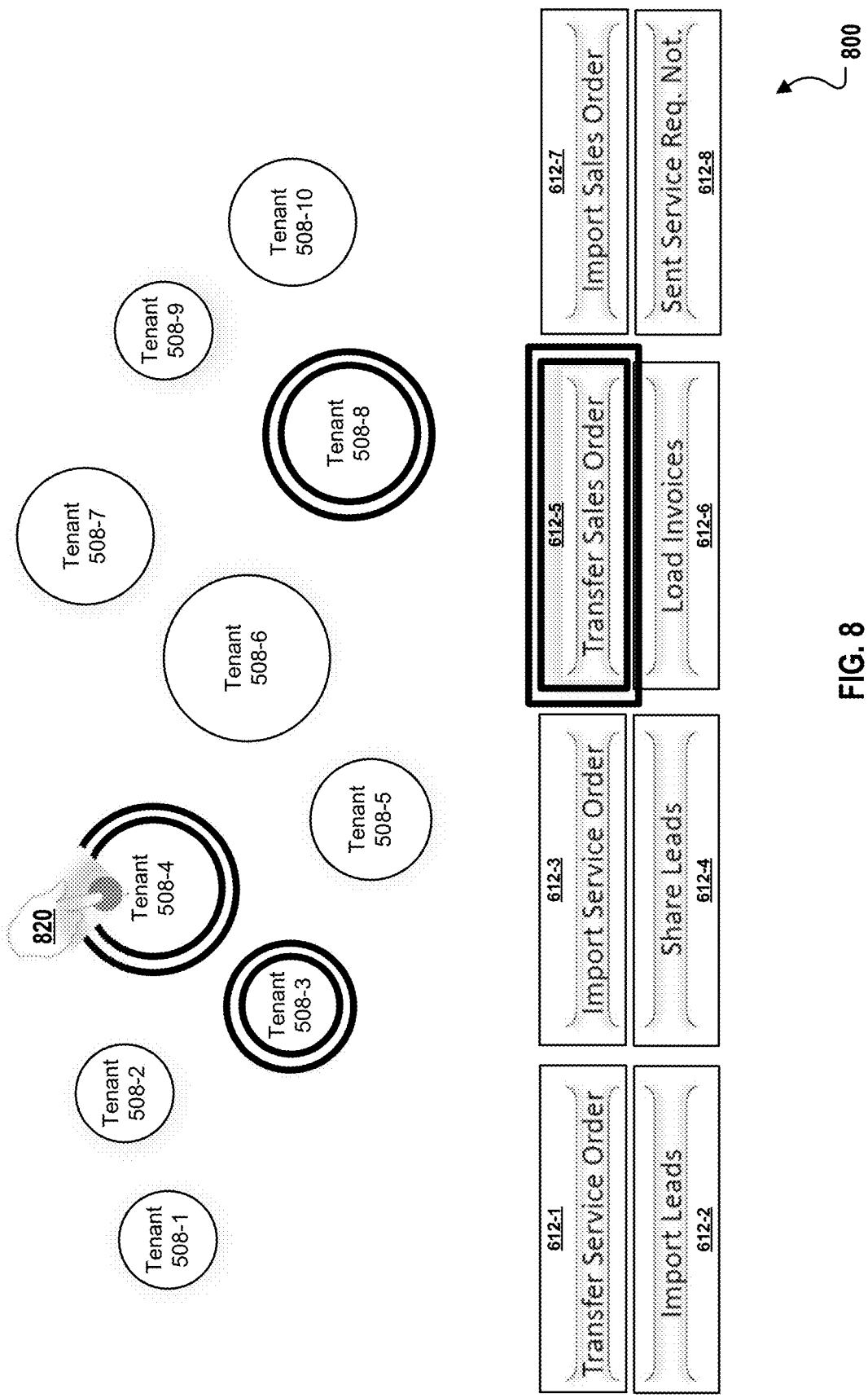
FIG. 8 is a partial screenshot of an example populated user interface illustrating tenant source systems selection functionality, according to an implementation of the present disclosure.

FIG. 8 is a partial screenshot of an example populated UI 800 illustrating tenant source systems selection functionality, according to an implementation of the present disclosure. In response to a selection 820 of the selectable tenant systems 508-4 as selected source tenant systems 508-4, the UI 800 is populated with an indicator indicating the selection of the selected source tenant systems 508-4, indicators indicating that the selectable tenant systems 508-3 and 508-8 may be selectable destination tenant systems 508 connected using the selected pathway for the particular task 612-5, the indicator indicating the selection of the selected pathway for the particular task 612-5, the other selectable pathways for the particular tasks 612, and the other selectable tenant systems 508. In the illustration of UI 800, The indicator indicating that the selectable tenant systems 508-10 may be connected using the selected pathway for the particular task 612-5, as previously shown in UI 700 of FIG. 7, is not shown in UI 800 because the selectable tenant systems 508-10 may not be the selectable destination tenant systems 508-10 that may connect to the selected source tenant systems 508-4 using the selected pathway for the particular task 612-5.

Figure 9:
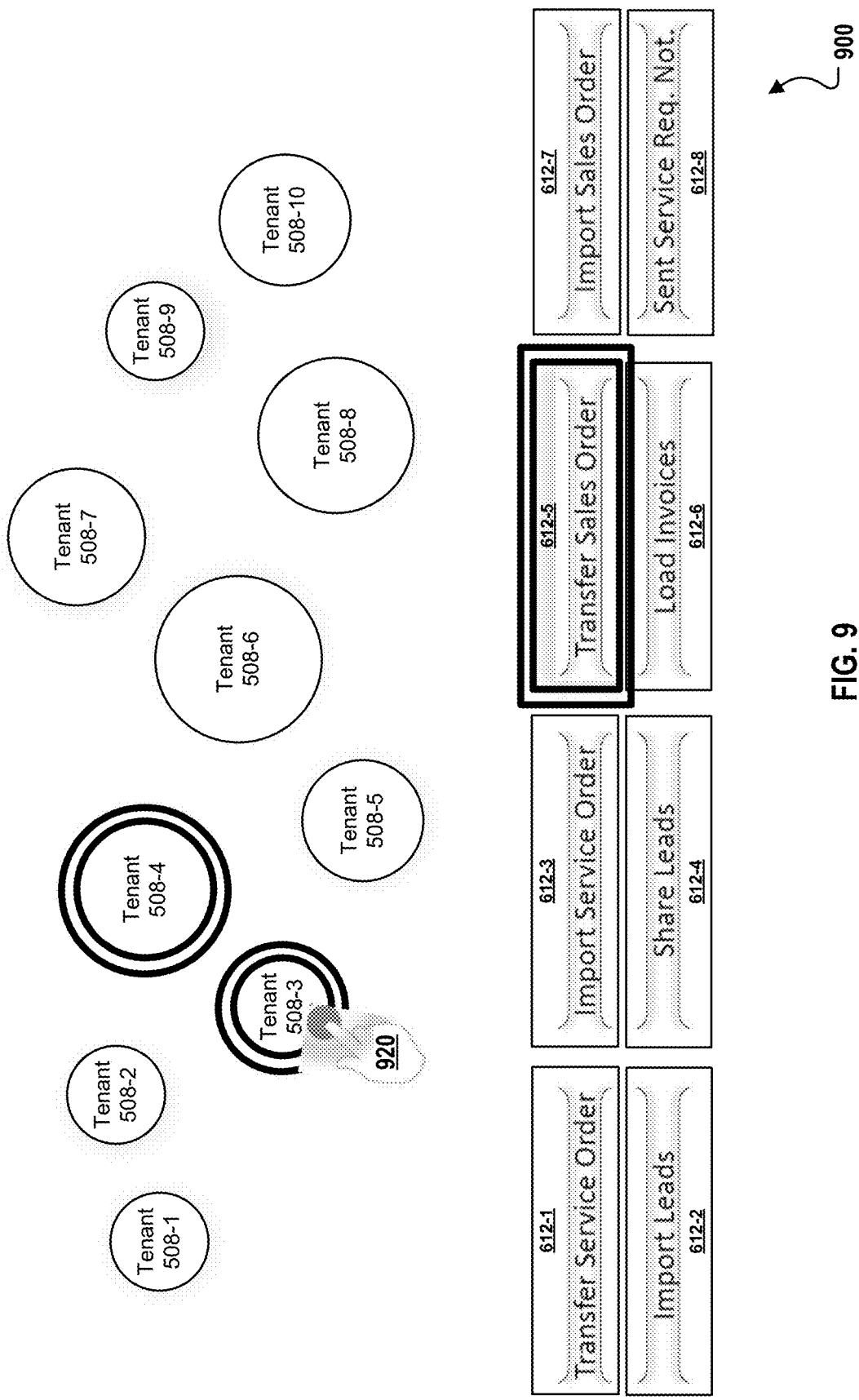
FIG. 9 is a partial screenshot of an example populated user interface illustrating tenant destination systems selection functionality, according to an implementation of the present disclosure.

FIG. 9 is a partial screenshot of an example populated UI 900 illustrating tenant destination systems selection functionality, according to an implementation of the present disclosure. In response to a selection 920 of the selectable tenant systems 508-3 as selected destination tenant systems 508-4, the UI 900 is populated with an indicator indicating the selection of the selected destination tenant systems 508-3, the indicator indicating the selection of the selected source tenant systems 508-4, the indicator indicating the selection of the selected pathway for the particular task 612-5, the other selectable pathways for the particular tasks 612, and the other selectable tenant systems 508.

Figure 10:
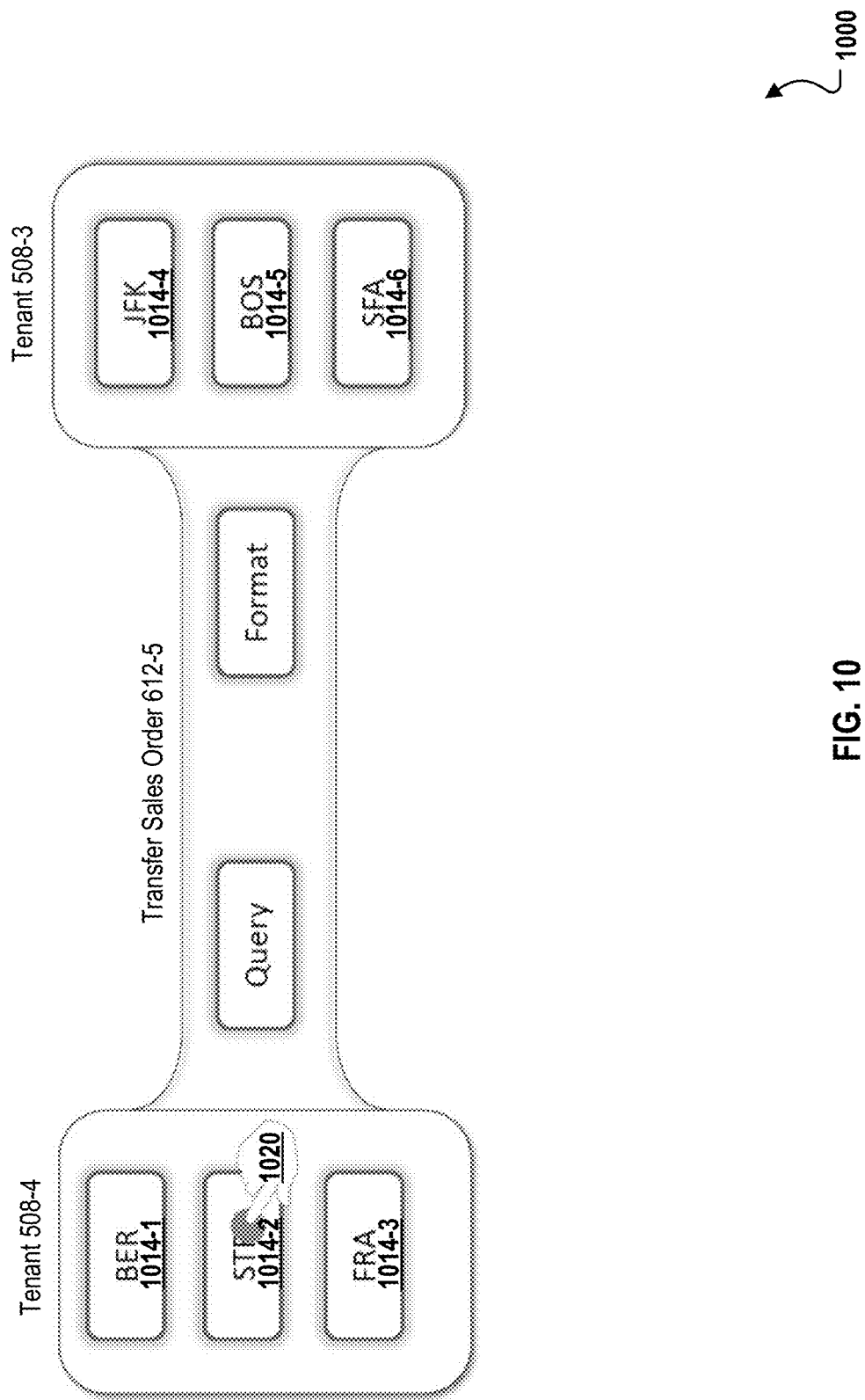
FIG. 10 is a partial screenshot of an example populated user interface illustrating particular tenant source system selection functionality for a configurable trusted integration pathway, according to an implementation of the present disclosure.

FIG. 10 is a partial screenshot of an example populated UI 1000 illustrating particular tenant source system selection functionality for a configurable trusted integration pathway, according to an implementation of the present disclosure. The UI 1000 is populated with the configurable trusted integration pathway including the source tenant systems 508-4, the destination tenant systems 508-3, and the pathway for the particular task 612-5, shown as transfer sales order 612-5. As shown, the source tenant systems 508-4 includes selectable source systems 1014, including a source system 1014-1 with a source system name of BER located in Berlin, a source system 1014-2 with a source system name of STR located in Stuttgart, and a source system 1014-3 with a source system name of FRA located in France. The destination tenant systems 508-3 includes selectable destination systems 1014, including a destination system 1014-3 with a destination system name of JFK located in New York, a destination system 1014-5 with a destination system name of BOS located in Boston, and a destination system 1014-6 with a destination system name of SFA located in San Francisco. The pathway for the particular task 612-5 includes a QUERY button or element and a FORMAT button or element that may be selected or activated when corresponding query configuration information or format configuration information is to be entered, respectively. The UI 1000 also shows a selection 1020 of the selectable source system 1014-2 of the source tenant systems 508-4.

Figure 11:
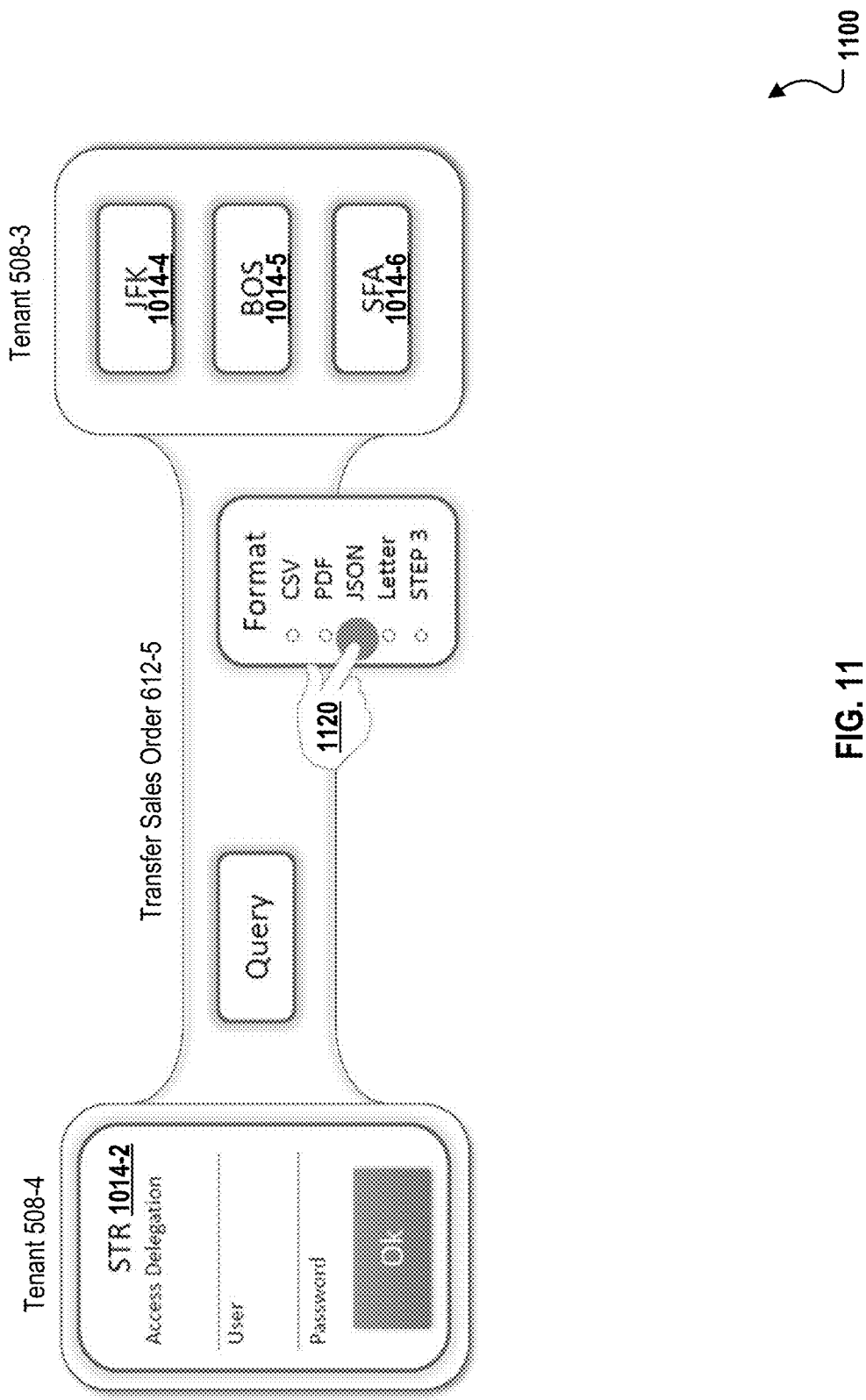
FIG. 11 is a partial screenshot of an example populated user interface illustrating format configuration information selection functionality for a configurable trusted integration pathway, according to an implementation of the present disclosure.

FIG. 11 is a partial screenshot of an example populated UI 1100 illustrating format configuration information selection functionality for a configurable trusted integration pathway, according to an implementation of the present disclosure. The UI 1100 is populated with source system configuration information for the selection of the selectable source system 1014-2 of the source tenant systems 508-4 previously selected in UI 1000 of FIG. 1000. The source system configuration information includes configurable access delegation parameters including a user parameter entry, a password parameter entry, and an OK button that may be selected or activated when the user and password parameters are successfully entered. In response to the FORMAT button or element being activated, the UI 1100 is populated with selectable output format parameters including a CSV format, a PDF, a JSON format, a Letter format, and a Step 3 format. The UI 1100 shows a selection 1120 of the selectable output JSON format parameter, where source sales orders are to be transferred from the source system 1014-2 to a selectable destination system 1014 of the tenant systems 508-3 as JSON formatted sales orders.

Figure 12:
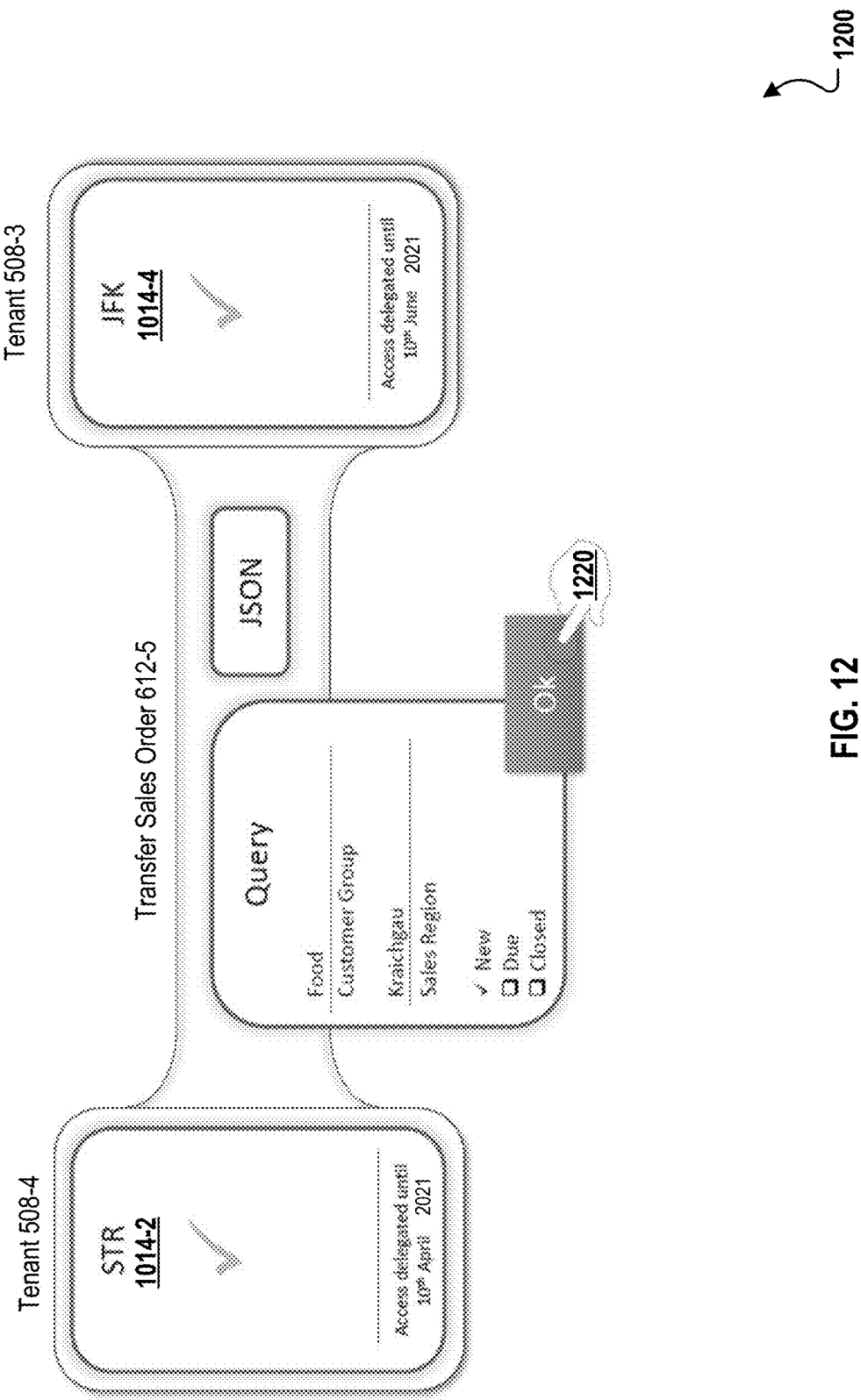
FIG. 12 is a partial screenshot of an example populated user interface illustrating query configuration information selection functionality for a configurable trusted integration pathway, according to an implementation of the present disclosure.

FIG. 12 is a partial screenshot of an example populated UI 1200 illustrating query configuration information selection functionality for a configurable trusted integration pathway, according to an implementation of the present disclosure.

The UI 1200 is populated with destination system 1014-4 of the destination tenant systems 508-3 in response to the selection of the selectable output JSON format parameter previously selected in FIG. 11. As illustrated, the destination system 1014-4 is the only destination system 1014 of the destination tenant systems 508-3 to support the transfer of sales orders to the output JSON format for the JSON formatted sales orders. The UI 1200 also shows access delegated until Apr. 10, 2021 for the source system 1014-2 and access delegated until Jun. 10, 2021 for the source system 1014-2 after the successful entry of the corresponding configurable access delegation parameters for each system. The UI 1200 shows an activation of an OK button 1220 after the successful entry of object query configuration information including configurable object query parameters including a customer group parameter entry, a sales region parameter entry, and selectable object statuses of source data objects to be queried, where the customer group parameter entered as Food, the sales region parameter entered as Kraichgau, and the selectable object status selected as New.

Figure 13:
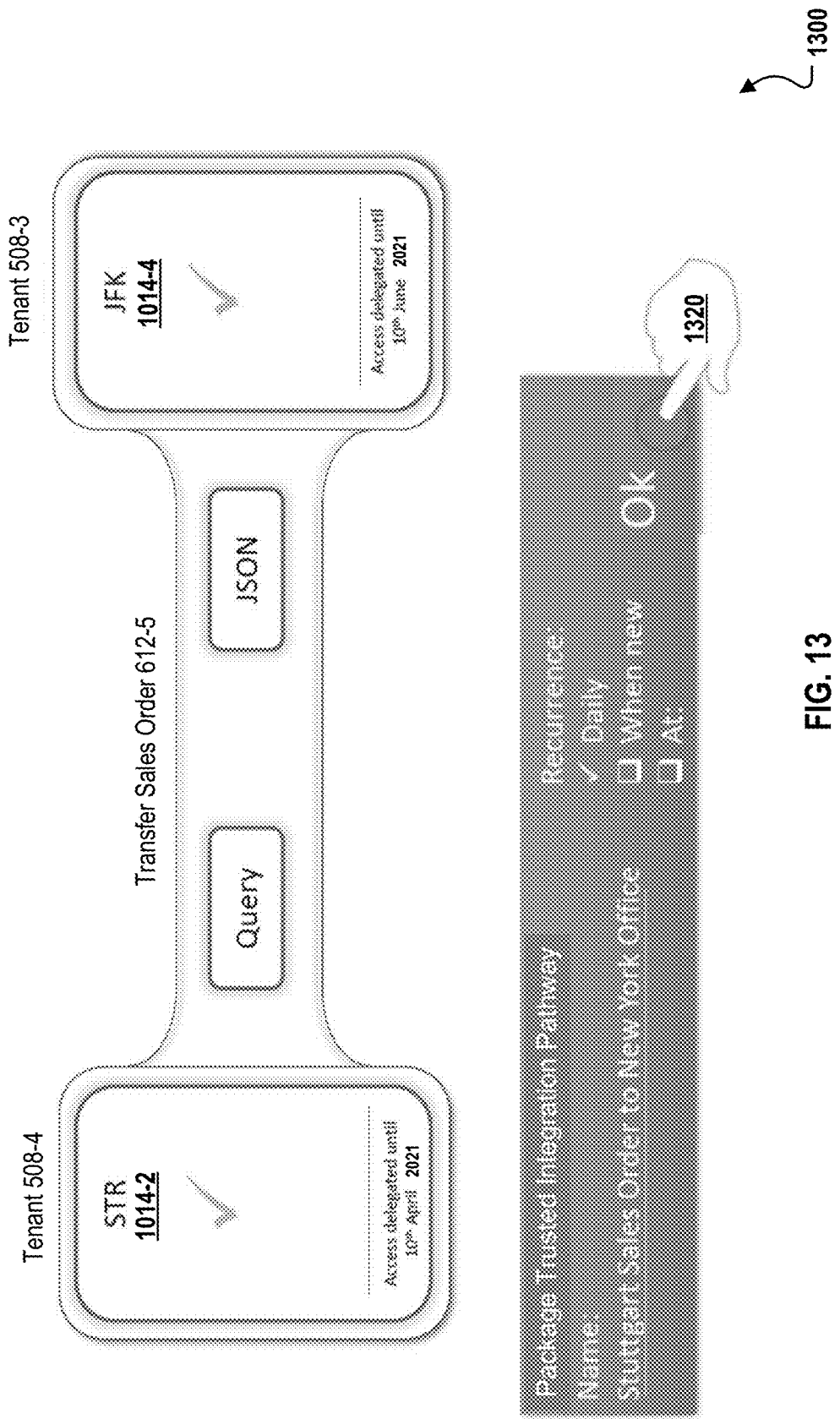
FIG. 13 is a partial screenshot of an example populated user interface illustrating recurrence configuration information selection functionality for a configured trusted integration pathway, according to an implementation of the present disclosure.

FIG. 13 is a partial screenshot of an example populated UI 1300 illustrating recurrence configuration information selection functionality for a configured trusted integration pathway, according to an implementation of the present disclosure. As illustrated, the UI 1300 is populated with the configured trusted integration pathway previously configured in UI 1200 of FIG. 12 including the source system 1014-2 of the source tenant systems 508-4, the destination system 1014-4 of the destination tenant systems 508-3, and the pathway for the particular task 612-5. The UI 1300 shows an activation of an OK button 1320 after the successful entry of package configuration information including configurable package parameters including a package trusted integration pathway name parameter entry, and configurable recurrence parameters including a selectable daily recurrence parameter, a selectable when new recurrence parameter, and a selectable an At parameter, where the package trusted integration pathway name parameter entered as Stuttgart Sales Order to New York Office, and a selection of the selectable daily recurrence parameter selected.

Figure 14:
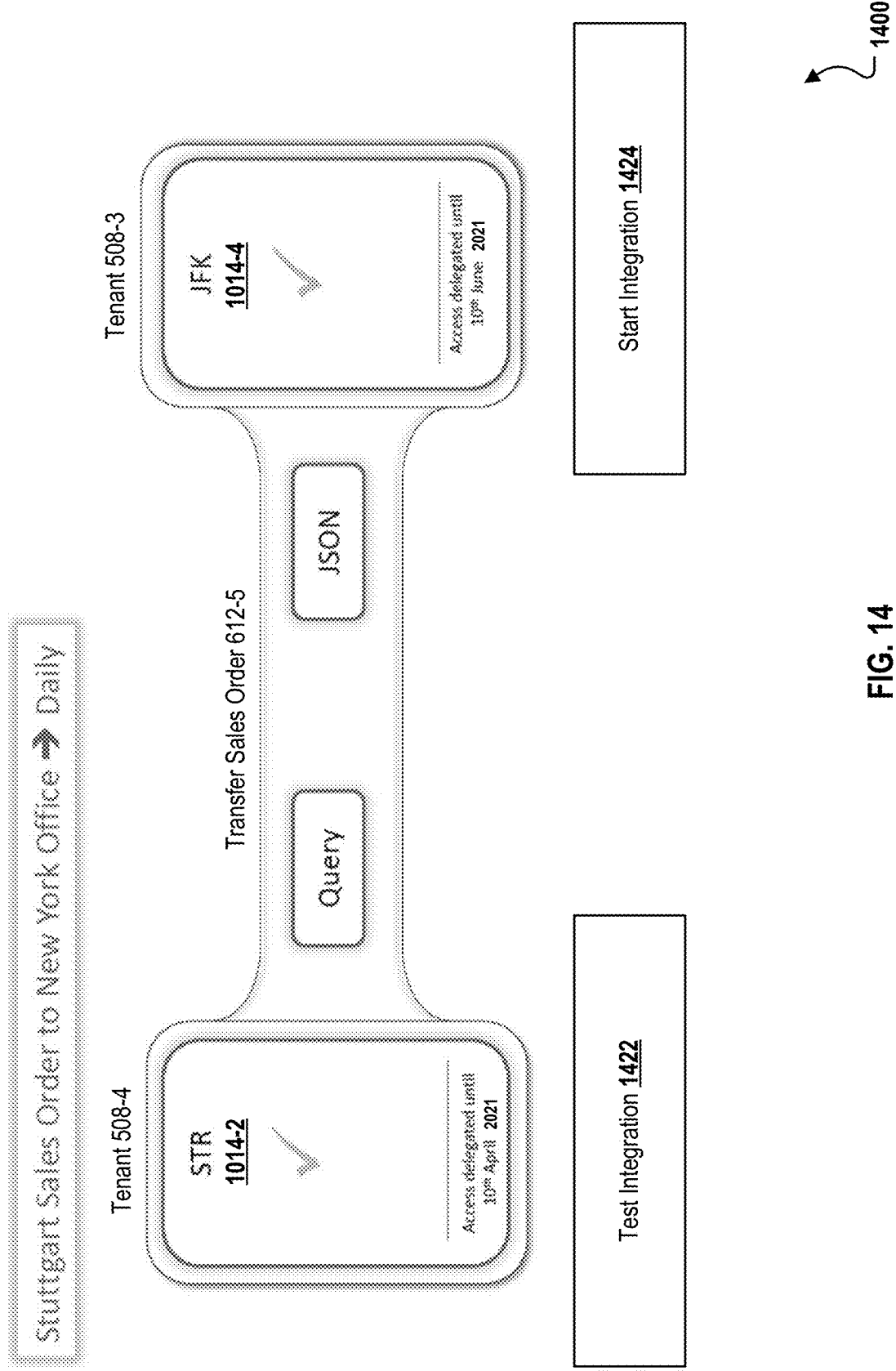
FIG. 14 is a partial screenshot of an example populated user interface illustrating test and start integration functionality for a packaged trusted integration pathway, according to an implementation of the present disclosure.

FIG. 14 is a partial screenshot of an example populated UI 1400 illustrating test and start integration functionality for a packaged trusted integration pathway, according to an implementation of the present disclosure. As illustrated, the UI 1400 is populated with the packaged trusted integration pathway previously packaged in UI 1300 of FIG. 13 including the packaged trusted integration pathway name of Stuttgart Sales Order to New York Office, the selected daily recurrence parameter of Daily, the source system 1014-2 of the source tenant systems 508-4, the destination system 1014-4 of the destination tenant systems 508-3, and the pathway for the particular task 612-5. The UI 1400 shows a test integration element 1422 that may be activated when the packaged trusted integration pathway is to be tested. The UI 1400 also shows a start integration element 1424 that may be activated when the packaged trusted integration pathway is to be started.

Figure 15:
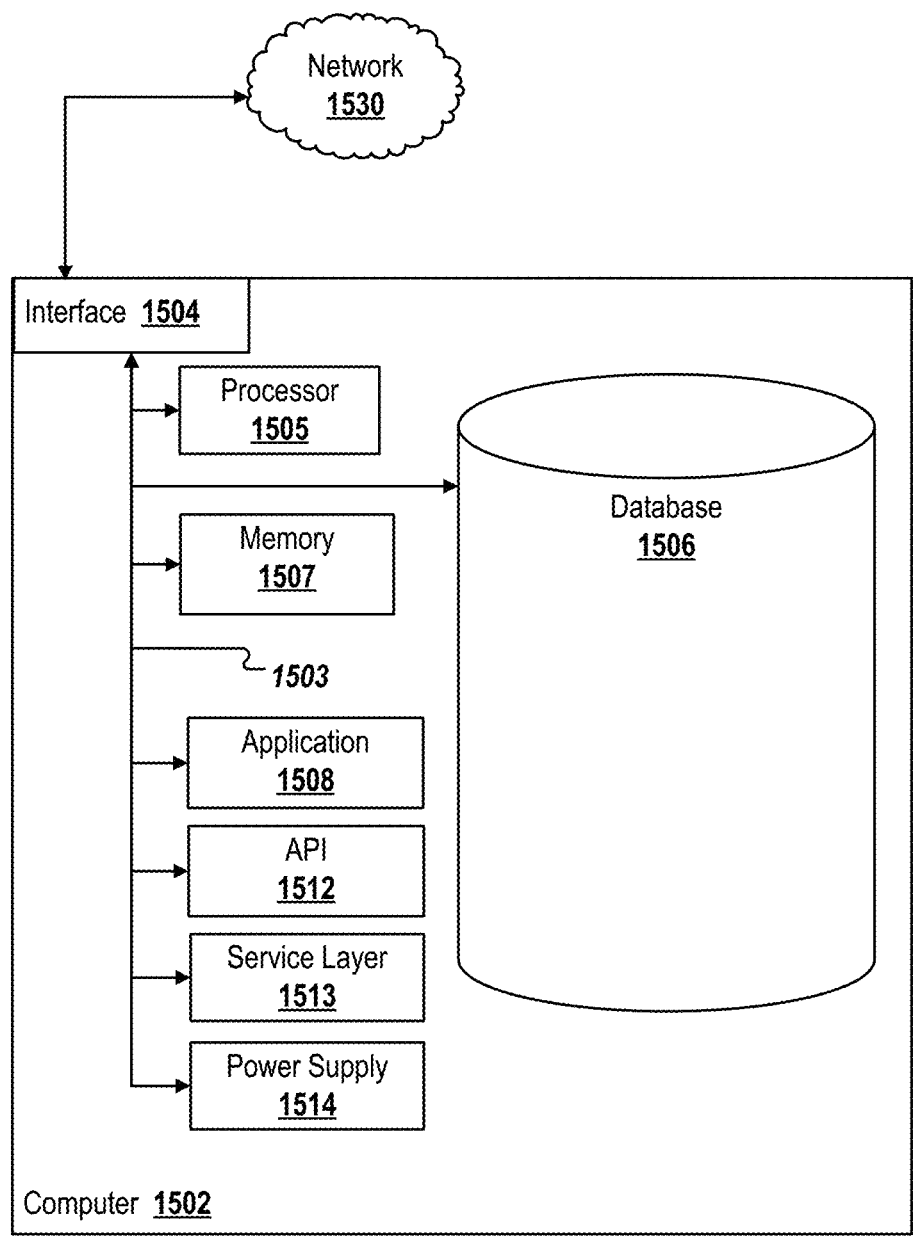
FIG. 15 is a block diagram illustrating an example of a computer-implemented system used to provide computational functionalities associated with described algorithms, methods, functions, processes, flows, and procedures, according to an implementation of the present disclosure.

FIG. 15 is a block diagram illustrating an example of a computer-implemented System 1500 used to provide computational functionalities associated with described algorithms, methods, functions, processes, flows, and procedures, according to an implementation of the present disclosure. In the illustrated implementation, System 1500 includes a Computer 1502 and a Network 1530.

The illustrated Computer 1502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1502 can include an input device, such as a keypad, keyboard, or touch screen, or a combination of input devices that can accept user information, and an output device that conveys information associated with the operation of the Computer 1502, including digital data, visual, audio, another type of information, or a combination of types of information, on a graphical-type user interface (UI) (or GUI) or other UI.

The Computer 1502 can serve in a role in a distributed computing system as, for example, a client, network component, a server, or a database or another persistency, or a combination of roles for performing the subject matter described in the present disclosure. The illustrated Computer 1502 is communicably coupled with a Network 1530. In some implementations, one or more components of the Computer 1502 can be configured to operate within an environment, or a combination of environments, including cloud-computing, local, or global.

At a high level, the Computer 1502 is an electronic computing device operable to receive, transmit, process, store, or manage data and information associated with the described subject matter. According to some implementations, the Computer 1502 can also include or be communicably coupled with a server, such as an application server, e-mail server, web server, caching server, or streaming data server, or a combination of servers.

The Computer 1502 can receive requests over Network 1530 (for example, from a client software application executing on another Computer 1502) and respond to the received requests by processing the received requests using a software application or a combination of software applications. In addition, requests can also be sent to the Computer 1502 from internal users (for example, from a command console or by another internal access method), external or third-parties, or other entities, individuals, systems, or computers.

Each of the components of the Computer 1502 can communicate using a System Bus 1503. In some implementations, any or all of the components of the Computer 1502, including hardware, software, or a combination of hardware and software, can interface over the System Bus 1503 using an application programming interface (API) 1512, a Service Layer 1513, or a combination of the API 1512 and Service Layer 1513. The API 1512 can include specifications for routines, data structures, and object classes. The API 1512 can be either computer-language independent or dependent and refer to a complete interface, a single function, or even a set of APIs. The Service Layer 1513 provides software services to the Computer 1502 or other components (whether illustrated or not) that are communicably coupled to the Computer 1502. The functionality of the Computer 1502 can be accessible for all service consumers using the Service Layer 1513. Software services, such as those provided by the Service Layer 1513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1502, alternative implementations can illustrate the API 1512 or the Service Layer 1513 as stand-alone components in relation to other components of the Computer 1502 or other components (whether illustrated or not) that are communicably coupled to the Computer 1502. Moreover, any or all parts of the API 1512 or the Service Layer 1513 can be implemented as a child or a sub-module of another software module, enterprise application, or hardware module without departing from the scope of the present disclosure.

The Computer 1502 includes an Interface 1504. Although illustrated as a single Interface 1504, two or more Interfaces 1504 can be used according to particular needs, desires, or particular implementations of the Computer 1502. The Interface 1504 is used by the Computer 1502 for communicating with another computing system (whether illustrated or not) that is communicatively linked to the Network 1530 in a distributed environment. Generally, the Interface 1504 is operable to communicate with the Network 1530 and includes logic encoded in software, hardware, or a combination of software and hardware. More specifically, the Interface 1504 can include software supporting one or more communication protocols associated with communications such that the Network 1530 or hardware of Interface 1504 is operable to communicate physical signals within and outside of the illustrated Computer 1502.

The Computer 1502 includes a Processor 1505. Although illustrated as a single Processor 1505, two or more Processors 1505 can be used according to particular needs, desires, or particular implementations of the Computer 1502. Generally, the Processor 1505 executes instructions and manipulates data to perform the operations of the Computer 1502 and any algorithms, methods, functions, processes, flows, and procedures as described in the present disclosure.

The Computer 1502 also includes a Database 1506 that can hold data for the Computer 1502, another component communicatively linked to the Network 1530 (whether illustrated or not), or a combination of the Computer 1502 and another component. For example, Database 1506 can be an in-memory or conventional database storing data consistent with the present disclosure. In some implementations, Database 1506 can be a combination of two or more different database types (for example, a hybrid in-memory and conventional database) according to particular needs, desires, or particular implementations of the Computer 1502 and the described functionality. Although illustrated as a single Database 1506, two or more databases of similar or differing types can be used according to particular needs, desires, or particular implementations of the Computer 1502 and the described functionality. While Database 1506 is illustrated as an integral component of the Computer 1502, in alternative implementations, Database 1506 can be external to the Computer 1502.

The Computer 1502 also includes a Memory 1507 that can hold data for the Computer 1502, another component or components communicatively linked to the Network 1530 (whether illustrated or not), or a combination of the Computer 1502 and another component. Memory 1507 can store any data consistent with the present disclosure. In some implementations, Memory 1507 can be a combination of two or more different types of memory (for example, a combination of semiconductor and magnetic storage) according to particular needs, desires, or particular implementations of the Computer 1502 and the described functionality. Although illustrated as a single Memory 1507, two or more Memories 1507 or similar or differing types can be used according to particular needs, desires, or particular implementations of the Computer 1502 and the described functionality. While Memory 1507 is illustrated as an integral component of the Computer 1502, in alternative implementations, Memory 1507 can be external to the Computer 1502.

The Application 1508 is an algorithmic software engine providing functionality according to particular needs, desires, or particular implementations of the Computer 1502, particularly with respect to functionality described in the present disclosure. For example, Application 1508 can serve as one or more components, modules, or applications. Further, although illustrated as a single Application 1508, the Application 1508 can be implemented as multiple Applications 1508 on the Computer 1502. In addition, although illustrated as integral to the Computer 1502, in alternative implementations, the Application 1508 can be external to the Computer 1502.

The Computer 1502 can also include a Power Supply 1514. The Power Supply 1514 can include a rechargeable or non-rechargeable battery that can be configured to be either user- or non-user-replaceable. In some implementations, the Power Supply 1514 can include power-conversion or management circuits (including recharging, standby, or another power management functionality). In some implementations, the Power Supply 1514 can include a power plug to allow the Computer 1502 to be plugged into a wall socket or another power source to, for example, power the Computer 1502 or recharge a rechargeable battery.

There can be any number of Computers 1502 associated with, or external to, a computer system containing Computer 1502, each Computer 1502 communicating over Network 1530. Further, the term "client," "user," or other appropriate terminology can be used interchangeably, as appropriate, without departing from the scope of the present disclosure. Moreover, the present disclosure contemplates that many users can use one Computer 1502, or that one user can use multiple computers 1502.

Described implementations of the subject matter can include one or more features, alone or in combination.

For example, in a first implementation, a computer-implemented method, comprising: identifying, by a platform integration system (PIS), an end user interacting with the PIS; determining, by the PIS, a set of identity information associated with the end user; based on the set of identify information, determining, by the PIS, a set of systems and a set of configurable trusted integration pathways that the end user is authorized to create a trusted integration pathway between two systems; receiving, by the PIS, a selection of a source system and a destination system from the set of systems; identifying, by the PIS, a set of information from the source system that is allowed to be shared with the destination system based on pre-defined metadata; populating, by the PIS, a user interface (UI) with at least a portion of the set of information based on the pre-defined metadata; receiving, by the PIS, a selection of a set of the at least the portion of the set of information; and generating, by the PIS, a trusted integration pathway between the source system and the destination system based on the selection of the set of the at least the portion of the set of information and the pre-defined metadata.

The foregoing and other described implementations can each, optionally, include one or more of the following features:

A first feature, combinable with any of the following features, comprising: receiving a selection of a configurable trusted integration pathway of the set of configurable trusted integration pathways, wherein generating the trusted integration pathway between the source system and the destination system is further based on the selection of the configurable trusted integration pathway.

A second feature, combinable with any of the previous or following features, wherein the selection of the set of the at least the portion of the set of information comprises a source data object and associated object query configuration information, and wherein during execution of the trusted integration pathway, the set of information is queried from the source system and shared with the destination system based on the source data object and the associated object query configuration information.

A third feature, combinable with any of the previous or following features, wherein the selection of the set of the at least the portion of the set of information comprises output format configuration information, and wherein during execution of the trusted integration pathway, the set of information from the source system is mapped and transformed to a format supported by the destination system based on the output format configuration information.

A fourth feature, combinable with any of the previous or following features, wherein the selection of the set of the at least the portion of the set of information comprises source system configuration information and destination system configuration information, and wherein, during execution of the trusted integration pathway, access to the source system and the destination system is delegated based on the corresponding source system configuration information and the destination system configuration information.

A fifth feature, combinable with any of the previous or following features, comprising: receiving a selection of a set of recurrence configuration information that specifies when execution of a packaged trusted integration pathway between the source system and the destination system is to occur; and generating the packaged trusted integration pathway between the source system and the destination system based on the trusted integration pathway between the source system and the destination system and the selection of the set of recurrence configuration information.

A sixth feature, combinable with any of the previous or following features, wherein the pre-defined metadata maps between a set of human-understandable terms and corresponding set of PIS parameters, and wherein the corresponding set of PIS parameters comprises one or more tenants, one or more entities, one or more systems including one or more source systems and one or more destination systems, one or more system types, one or more data objects including one or more source data objects and one or more destination data objects, one or more sender and receiver protocols, one or more query parameters for each of the one or more source data objects to be transferred, and one or more mappings and transformations for each of the one or more source data objects to be transferred.

In a second implementation, a computer-implemented method, comprising: creating, by a platform integration system (PIS), one or more parameterized integration pathway templates based on one or more corresponding parameterized integration pathway template definitions received from a client system; creating, by the PIS, a pre-configured trusted integration pathway for a particular task based on one or more source systems and one or more destination systems received from a client system; grouping, by the PIS, one or more parameterized integration pathway templates that together achieve the particular task of the one or more parameterized integration pathway templates by the particular task; defining, by the PIS, a set of human-understandable terms and metadata received from the client system, wherein the metadata maps between the set of human-understandable terms and a corresponding set of PIS parameters; creating, by the PIS, a configurable trusted integration pathway based on one or more source data objects received from the client system, the pre-configured trusted integration pathway for a particular task, the one or more parameterized integration pathway templates grouped by the particular task, the metadata, an object query configuration, and an output format configuration; and configuring, by the PIS, the configurable trusted integration pathway based on the metadata and a series of selections including a selected source system name of one or more source system names, a selected destination system name of one or more destination system names, a selected source data object name of one or more source data object names, object query configuration selections and output format configuration selections received from the client system.

The foregoing and other described implementations can each, optionally, include one or more of the following features:

A first feature, combinable with any of the following features, wherein the one or more corresponding parameterized integration pathway template definitions comprises one or more corresponding particular sender and receiver protocols and one or more corresponding particular mapping for a source structure and a destination structure.

A second feature, combinable with any of the previous or following features, comprising: prior to configuring the configurable trusted integration pathway: assigning access control to the one or more source systems, the one or more source data objects, the configurable trusted integration pathway, and the one or more destination systems including assigning access rights to each role authorized to access the one or more source systems, the one or more source data objects, the configurable trusted integration pathway and assigning usage rights to each role authorized to use the one or more destination systems.

A third feature, combinable with any of the previous or following features, wherein configuring the configurable trusted integration pathway further comprises: receiving user data including role data having a role name and associated with an end user of the client system; mapping using the metadata: the role name to a role associated with the end user; the one or more source system names to the one or more source systems; the one or more destination system names to the one or more destination systems; and the one or more source data object names to the one or more source data objects; and determining whether the role associated with the end user has assigned access rights to access the one or more source systems, the one or more destination systems, and the one or more source data objects and has assigned usage rights to use the one or more destination systems.

A fourth feature, combinable with any of the previous or following features, wherein configuring the configurable trusted integration pathway is further based on a second series of selections including source system configuration selections and destination system configuration selections received from the client system.

A fifth feature, combinable with any of the previous or following features, comprising: creating a trusted integration pathway based on at least a configured trusted integration pathway name received from the client system, the metadata, and the configured trusted integration pathway; and packaging the trusted integration pathway based on recurrence configuration selections received from the client system and the metadata.

A sixth feature, combinable with any of the previous or following features, wherein the corresponding set of PIS parameters comprises one or more tenants, one or more entities, one or more systems including one or more source systems and one or more destination systems, one or more system types, one or more data objects including one or more source data objects and one or more destination data objects, one or more sender and receiver protocols, one or more query parameters for each of the one or more source data objects to be transferred, and one or more mappings and transformations for each of the one or more source data objects to be transferred.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: identifying, by a platform integration system (PIS), an end user interacting with the PIS; determining, by the PIS, a set of identity information associated with the end user; based on the set of identify information, determining, by the PIS, a set of systems and a set of configurable trusted integration pathways that the end user is authorized to create a trusted integration pathway between two systems; receiving, by the PIS, a selection of a source system and a destination system from the set of systems; identifying, by the PIS, a set of information from the source system that is allowed to be shared with the destination system based on pre-defined metadata; populating, by the PIS, a user interface (UI) with at least a portion of the set of information based on the pre-defined metadata; receiving, by the PIS, a selection of a set of the at least the portion of the set of information; and generating, by the PIS, a trusted integration pathway between the source system and the destination system based on the selection of the set of the at least the portion of the set of information and the pre-defined metadata.

The foregoing and other described implementations can each, optionally, include one or more of the following features:

A first feature, combinable with any of the following features, wherein the one or more operations further comprising: receiving a selection of a configurable trusted integration pathway of the set of configurable trusted integration pathways, wherein generating the trusted integration pathway between the source system and the destination system is further based on the selection of the configurable trusted integration pathway.

A second feature, combinable with any of the previous or following features, wherein the selection of the set of the at least the portion of the set of information comprises a source data object and associated object query configuration information, and wherein during execution of the trusted integration pathway, the set of information is queried from the source system and shared with the destination system based on the source data object and the associated object query configuration information.

A third feature, combinable with any of the previous or following features, wherein the selection of the set of the at least the portion of the set of information comprises output format configuration information, and wherein during execution of the trusted integration pathway, the set of information from the source system is mapped and transformed to a format supported by the destination system based on the output format configuration information.

A fourth feature, combinable with any of the previous or following features, wherein the selection of the set of the at least the portion of the set of information comprises source system configuration information and destination system configuration information, and wherein, during execution of the trusted integration pathway, access to the source system and the destination system is delegated based on the corresponding source system configuration information and the destination system configuration information.

A fifth feature, combinable with any of the previous or following features, wherein the one or more operations further comprising: receiving a selection of a set of recurrence configuration information that specifies when execution of a packaged trusted integration pathway between the source system and the destination system is to occur; and generating the packaged trusted integration pathway between the source system and the destination system based on the trusted integration pathway between the source system and the destination system and the selection of the set of recurrence configuration information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
identifying, by a platform integration system (PIS), an end user interacting with the PIS;
determining, by the PIS, a set of identity information associated with the end user;
based on the set of identity information associated with the end user, determining, by the PIS, a set of systems and a set of configurable trusted integration pathways, wherein the end user is authorized to create a trusted integration pathway between two systems of the set of systems;
receiving, by the PIS, a selection of a source system and a destination system from the set of systems;
identifying, by the PIS, a set of information from the source system that is allowed to be shared with the destination system based on pre-defined metadata;
populating, by the PIS, a user interface (UI) with at least a portion of the set of information based on the pre-defined metadata;
receiving, by the PIS, a selection of a set of the at least the portion of the set of information;
receiving, by the PIS, a selection of a configurable trusted integration pathway from the set of configurable trusted integration pathways; and
generating, by the PIS, a trusted integration pathway between the source system and the destination system based on the selection of the set of the at least the portion of the set of information, the selection of the configurable trusted integration pathway, and the pre-defined metadata.

2. The computer-implemented method of claim 1, wherein the selection of the set of the at least the portion of the set of information comprises a source data object and associated object query configuration information, and wherein during execution of the trusted integration pathway, the set of information is queried from the source system and shared with the destination system based on the source data object and the associated object query configuration information.

3. The computer-implemented method of claim 1, wherein the selection of the set of the at least the portion of the set of information comprises output format configuration information, and wherein during execution of the trusted integration pathway, the set of information from the source system is mapped and transformed to a format supported by the destination system based on the output format configuration information.

4. The computer-implemented method of claim 1, wherein the selection of the set of the at least the portion of the set of information comprises source system configuration information and destination system configuration information, and wherein, during execution of the trusted integration pathway, access to the source system and the destination system is delegated based on the corresponding source system configuration information and the destination system configuration information.

5. The computer-implemented method of claim 1, comprising:
receiving a selection of a set of recurrence configuration information that specifies when execution of a packaged trusted integration pathway between the source system and the destination system is to occur; and
generating the packaged trusted integration pathway between the source system and the destination system based on the trusted integration pathway between the source system and the destination system and the selection of the set of recurrence configuration information.

6. The computer-implemented method of claim 1, wherein the pre-defined metadata maps between a set of human-understandable terms and corresponding set of PIS parameters, and wherein the corresponding set of PIS parameters comprises one or more tenants, one or more entities, two or more systems including one or more source systems and one or more destination systems, one or more system types, two or more data objects including one or more source data objects to be transferred and one or more destination data objects, one or more sender-receiver protocols, one or more query parameters for each of the one or more source data objects to be transferred, and one or more mappings and one or more transformations for each of the one or more source data objects to be transferred.

7. A computer-implemented method, comprising:
creating, by a platform integration system (PIS), two or more parameterized integration pathway templates based on one or more corresponding parameterized integration pathway template definitions received from a client system;
creating, by the PIS, a pre-configured trusted integration pathway for a particular task based on one or more source systems and one or more destination systems received from a client system;
grouping, by the PIS, two or more parameterized integration pathway templates of the created two or more parameterized integration pathway templates, wherein using the grouped two or more parameterized integration pathway templates together achieves the particular task;
defining, by the PIS, a set of human-understandable terms and metadata received from the client system, wherein the metadata maps between the set of human-understandable terms and a corresponding set of PIS parameters;

creating, by the PIS, a configurable trusted integration pathway based on one or more source data objects received from the client system, the pre-configured trusted integration pathway for the particular task, the grouped two or more parameterized integration pathway templates, the metadata, an object query configuration, and an output format configuration; and
configuring, by the PIS, the configurable trusted integration pathway based on the metadata and a series of selections including a selected source system name of one or more source system names, a selected destination system name of one or more destination system names, a selected source data object name of one or more source data object names, object query configuration selections and output format configuration selections received from the client system.

8. The computer-implemented method of claim 7, wherein the one or more corresponding parameterized integration pathway template definitions comprises one or more corresponding particular sender and receiver protocols and one or more corresponding particular mapping for a source structure and a destination structure.

9. The computer-implemented method of claim 7, comprising:
prior to configuring the configurable trusted integration pathway:
assigning access control to the one or more source systems, the one or more source data objects, the configurable trusted integration pathway, and the one or more destination systems including assigning access rights to each role authorized to access the one or more source systems, the one or more source data objects, the configurable trusted integration pathway and assigning usage rights to each role authorized to use the one or more destination systems.

10. The computer-implemented method of claim 9, wherein configuring the configurable trusted integration pathway further comprises:
receiving user data including role data having a role name and associated with an end user of the client system;
mapping using the metadata:
the role name to a role associated with the end user;
the one or more source system names to the one or more source systems;
the one or more destination system names to the one or more destination systems; and
the one or more source data object names to the one or more source data objects; and
determining whether the role associated with the end user has assigned access rights to access the one or more source systems, the one or more destination systems, and the one or more source data objects and has assigned usage rights to use the one or more destination systems.

11. The computer-implemented method of claim 7, wherein configuring the configurable trusted integration pathway is further based on a second series of selections including source system configuration selections and destination system configuration selections received from the client system.

12. The computer-implemented method of claim 7, comprising:
creating a trusted integration pathway based on at least a configured trusted integration pathway name received from the client system, the metadata, and the configured trusted integration pathway; and packaging the trusted integration pathway based on recurrence configuration selections received from the client system and the metadata.

13. The computer-implemented method of claim 7, wherein the corresponding set of PIS parameters comprises one or more tenants, one or more entities, two or more systems including one or more source systems and one or more destination systems, one or more system types, two or more data objects including one or more source data objects to be transferred and one or more destination data objects, one or more sender-receiver protocols, one or more query parameters for each of the one or more source data objects to be transferred, and one or more mappings and one or more transformations for each of the one or more source data objects to be transferred.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
identifying, by a platform integration system (PIS), an end user interacting with the PIS;
determining, by the PIS, a set of identity information associated with the end user;
based on the set of identity information associated with the end user, determining, by the PIS, a set of systems and a set of configurable trusted integration pathways, wherein the end user is authorized to create a trusted integration pathway between two systems of the set of systems;
receiving, by the PIS, a selection of a source system and a destination system from the set of systems;
identifying, by the PIS, a set of information from the source system that is allowed to be shared with the destination system based on pre-defined metadata;
populating, by the PIS, a user interface (UI) with at least a portion of the set of information based on the pre-defined metadata;
receiving, by the PIS, a selection of a set of the at least the portion of the set of information;
receiving, by the PIS, a selection of a configurable trusted integration pathway from the set of configurable trusted integration pathways; and
generating, by the PIS, a trusted integration pathway between the source system and the destination system based on the selection of the set of the at least the portion of the set of information, the selection of the configurable trusted integration pathway, and the pre-defined metadata.

15. The computer-implemented system of claim 14, wherein the selection of the set of the at least the portion of the set of information comprises a source data object and associated object query configuration information, and wherein during execution of the trusted integration pathway, the set of information is queried from the source system and shared with the destination system based on the source data object and the associated object query configuration information.

16. The computer-implemented system of claim 14, wherein the selection of the set of the at least the portion of the set of information comprises output format configuration information, and wherein during execution of the trusted integration pathway, the set of information from the source system is mapped and transformed to a format supported by the destination system based on the output format configuration information.

17. The computer-implemented system of claim 14, wherein the selection of the set of the at least the portion of the set of information comprises source system configuration information and destination system configuration information, and wherein, during execution of the trusted integration pathway, access to the source system and the destination system is delegated based on the corresponding source system configuration information and the destination system configuration information.

18. The computer-implemented system of claim 14, wherein the one or more operations further comprising:
receiving a selection of a set of recurrence configuration information that specifies when execution of a packaged trusted integration pathway between the source system and the destination system is to occur; and
generating the packaged trusted integration pathway between the source system and the destination system based on the trusted integration pathway between the source system and the destination system and the selection of the set of recurrence configuration information.

* * * * *